US012085996B2

(12) United States Patent
Kim et al.

(10) Patent No.: US 12,085,996 B2
(45) Date of Patent: Sep. 10, 2024

(54) ELECTRONIC DEVICE INCLUDING FLEXIBLE DISPLAY AND METHOD OF CONTROLLING MOTOR DRIVING IN THE ELECTRONIC DEVICE INCLUDING FLEXIBLE DISPLAY

(71) Applicant: SAMSUNG ELECTRONICS CO., LTD., Suwon-si (KR)

(72) Inventors: Heetae Kim, Suwon-si (KR); Minsu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 17/966,823

(22) Filed: Oct. 15, 2022

(65) Prior Publication Data

US 2023/0122508 A1 Apr. 20, 2023

Related U.S. Application Data

(63) Continuation of application No. PCT/KR2022/015311, filed on Oct. 11, 2022.

(30) Foreign Application Priority Data

Oct. 15, 2021 (KR) .................. 10-2021-0137651

(51) Int. Cl.
*G06F 1/16* (2006.01)
*G06F 1/3212* (2019.01)
(Continued)

(52) U.S. Cl.
CPC .......... *G06F 1/1675* (2013.01); *G06F 1/1624* (2013.01); *G06F 1/1652* (2013.01);
(Continued)

(58) Field of Classification Search
CPC .... G06F 1/1675; G06F 1/1624; G06F 1/1652; G06F 1/3212; G06F 1/3265; H02P 29/40
See application file for complete search history.

(56) References Cited

U.S. PATENT DOCUMENTS 10,747,269 B1    8/2020   Choi et al.
2014/0004906 A1   1/2014   Chi et al.
(Continued)

FOREIGN PATENT DOCUMENTS

JP        2015-152816     8/2015
KR   10-2016-0123201   10/2016
(Continued)

OTHER PUBLICATIONS

Search Report dated Jan. 19, 2023 in International Patent Application No. PCT/KR2022/015311.
(Continued)

*Primary Examiner* — Said Bouziane
(74) *Attorney, Agent, or Firm* — Nixon & Vanderhye, P.C.

(57) ABSTRACT

An electronic device may include a first housing, a second housing configured to accommodate at least a part of the first housing and guide sliding movement of the first housing, a flexible display including a first display area coupled to the first housing and a second display area extending from the first display area, a gear disposed inside the second housing and configured to move the flexible display, a motor configured to rotate the gear, at least one sensor, and at least one processor. The at least one processor may be configured to identify a state of the electronic device including at least one of a battery current, a battery voltage, an internal consumption current, a battery level, or an electronic device temperature, based on information sensed through the at least one sensor, and control a speed of the motor or discontinue (Continued)

driving of the motor based on the state of the electronic device.

20 Claims, 10 Drawing Sheets

(51) Int. Cl.
 *G06F 1/3234* (2019.01)
 *H02P 29/40* (2016.01)
(52) U.S. Cl.
 CPC .......... *G06F 1/3212* (2013.01); *G06F 1/3265* (2013.01); *H02P 29/40* (2016.02)

(56) References Cited

U.S. PATENT DOCUMENTS

| 2015/0029229 | A1 | 1/2015 | Voutsas |
| 2016/0231813 | A1 | 8/2016 | Xu |
| 2016/0307545 | A1 | 10/2016 | Lee et al. |
| 2017/0364120 | A1 | 12/2017 | Zhao et al. |
| 2020/0267246 | A1 | 8/2020 | Song et al. |
| 2021/0278878 | A1* | 9/2021 | Shim ...................... G06F 1/1656 |
| 2021/0294280 | A1* | 9/2021 | Fujioka .................. H02P 29/00 |
| 2023/0029563 | A1 | 2/2023 | Choi et al. |

FOREIGN PATENT DOCUMENTS

| KR | 10-2020-0064573 | 6/2020 |
| KR | 10-2021-0116542 | 9/2021 |
| WO | 2020/256183 | 12/2020 |
| WO | 2021/085658 | 5/2021 |
| WO | 2021/170229 | 9/2021 |

OTHER PUBLICATIONS

Written Opinion dated Jan. 19, 2023 in International Patent Application No. PCT/KR2022/015311.

* cited by examiner

ELECTRONIC DEVICE INCLUDING FLEXIBLE DISPLAY AND METHOD OF CONTROLLING MOTOR DRIVING IN THE ELECTRONIC DEVICE INCLUDING FLEXIBLE DISPLAY

CROSS-REFERENCE TO RELATED APPLICATIONS

This application is a continuation of International Application No. PCT/KR2022/015311 designating the United States, filed on Oct. 11, 2022, in the Korean Intellectual Property Receiving Office and claiming priority to Korean Patent Application No. 10-2021-0137651 filed on Oct. 15, 2021, in the Korean Intellectual Property Office, the disclosures of all of which are incorporated by reference herein in their entireties

BACKGROUND

Field

The disclosure relates to an electronic device including a flexible display.

Description of Related Art

Along with the development of electronics, information, and communication technologies, various functions are integrated into one portable communication device or electronic device. For example, a smart phone includes the function of an audio player, an image capturing device, or an electronic notebook as well as a communication function, and more functions may be implemented in the smart phone through installation of additional applications.

As the use of personal or portable communication devices such as smart phones has become common, user demands for portability and ease of use are increasing. For example, a touch screen display may provide a screen, for example, that is both an output device that outputs visual information and a virtual keypad that replaces a mechanical input device (e.g., a button-type input device). As a result, a portable communication device or an electronic device may provide the same or improved usability (e.g., a larger screen) while being miniaturized. On the other hand, as a flexible display such as a foldable or rollable display is commercialized, it is expected that the portability and convenience of use of the electronic device will be further improved.

SUMMARY

An electronic device including a flexible display may be implemented such that structures in the electronic device may relatively move (e.g., slide, rotate, or make a rotational movement) with respect to each other. For example, when some structure (e.g., a first housing and some area of the flexible display) moves inside or away from another structure (e.g., a second housing), the flexible display may provide an extension structure according to a sliding movement. The electronic device may include a driving structure (e.g., a motor) capable of providing a thrust (force) for slide-in or slide-out (e.g., sliding movement) of the flexible display, for the sliding movement-based extension structure.

The motor of the electronic device may operate by receiving power from a battery, and along with the operation of the motor, the flexible display may extend or retract while sliding in or out (e.g., making a sliding movement).

For smooth slide-in or slide-out of the flexible display (sliding at a user-friendly speed) in the electronic device, appropriate power should be supplied to the motor. In general, relatively large power (e.g., 10 W to 15 W) (voltage or current) may be required for the slide-in or slide-out operation in the electronic device, compared to another function (e.g., a communication function, an audio play function, an image capturing function, an electronic note function, and/or various other application functions).

When the slide-in or slide-out operation is performed with a large power (or current) consumption, simultaneously with another function (e.g., a function with a large current consumption), a state in which a circuit or a battery within the electronic device may be damaged (e.g., an overcurrent protection (OCP) state) may be caused by an excessive current flow within the electronic device. Moreover, when the slide-in or slide-out operation is performed at a low battery level of the electronic device, a system power down state (e.g., a sudden momentary power loss (SMPL) state) may occur, in which the internal voltage of the electronic device may be lowered to or below a specified voltage (e.g., about 2V) due to the high power consumption. In a low-temperature and low-voltage state, the thrust of the motor of the electronic device may decrease, and the voltage drop of the battery may increase, while the repulsive force (sliding movement repulsive force) of the display may increase, thereby increasing the probability of occurrence of the SMPL state. When the slide-in or slide-out operation is performed in a high current consumption state or high temperature state of the electronic device, the temperature of the electronic device may become higher, and thus heat generation may lead to a problem.

To prevent the occurrence of the OCP state, the SMPL state, and/or the heat state due to the slide-in or slide-out operation, power supplied to the motor may be lowered to or below certain power. The resulting decrease in the speed of the motor may cause inconvenience, when a user uses the flexible display by extending or retracting the flexible display.

An embodiment of the disclosure provides an electronic device including a flexible display, and a method of controlling a driving motor in the electronic device including the flexible display, which may reduce the possibility of occurrence of an OCP state, an SMPL state, and/or heat generation by adjusting the speed of the driving motor based on the state or use scenario of the electronic device.

An embodiments of the disclosure provides an electronic device including a flexible display, and a method of controlling a driving motor in the electronic device including the flexible display, which may decrease the speed of the driving motor in a state or use scenario of the electronic device with a high possibility of occurrence of an OCP state, an SMPL state, and/or heat generation, and increase the speed of the driving motor in a state or use scenario of the electronic device with a low possibility of occurrence of the OCP state, the SMPL state, and/or the heat generation.

According to an embodiment of the disclosure, an electronic device may include a first housing, a second housing configured to accommodate at least a part of the first housing and guide sliding movement of the first housing, a flexible display including a first display area coupled to the first housing and a second display area extending from the first display area, a gear disposed inside the second housing and configured to move the flexible display, a motor configured to rotate the gear, at least one sensor, and at least one processor. The at least one processor may be configured to identify a state of the electronic device including at least one of a battery current, a battery voltage, an internal consumption current, a battery level, or an electronic device temperature, based on information sensed through the at least one sensor, and control a speed of the motor or discontinue driving of the motor based on the state of the electronic device.

According to an embodiment of the disclosure, a method of controlling motor driving in an electronic device including a flexible display may include identifying a slide operation start event of the flexible display, identifying at least one of a battery current, a battery voltage, an internal consumption current, a battery level, or an electronic device temperature based on information sensed through at least one sensor, based on the slide operation start event of the flexible display, and controlling a speed of a motor performing a slide operation of the flexible display or discontinuing driving of the motor, based on the at least one of the battery current, the battery voltage, the internal consumption current, the battery level, or the electronic device temperature.

According to an embodiment of the disclosure, a non-transitory storage medium may store instructions, and the instructions may be configured to, when executed by at least one processor, enable the at least one processor to perform at least one operation. The at least one operation may include identifying a slide operation start event of a flexible display, identifying at least one of a battery current, a battery voltage, an internal consumption current, a battery level, or an electronic device temperature based on information sensed through at least one sensor, based on the slide operation start event of the flexible display, and controlling a speed of a motor performing a slide operation of the flexible display or discontinuing driving of the motor, based on the at least one of the battery current, the battery voltage, the internal consumption current, the battery level, or the electronic device temperature.

An electronic device according to various embodiments of the disclosure may reduce occurrence of an overcurrent protection (OCP) state, a sudden momentary power loss (SMPL) state, and/or heat generation by adjusting the speed of the driving motor based on a state or use scenario of the electronic device.

According to various embodiments of the disclosure, the power of the electronic device may be effectively managed by decreasing the speed of the driving motor in a state or use scenario of the electronic device with a high possibility (e.g., greater than some threshold) of occurrence of the OCP state, the SMPL state, and/or heat generation, and increasing the speed of the driving motor in a state or use scenario of the electronic device with a low possibility (e.g., less than some threshold) of occurrence of the OCP state, the SMPL state, and/or the heat generation.

The effects and advantages achievable from the disclosure are not limited to the above-described effects, and other effects and advantages that are not mentioned may be clearly understood from what is described below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may denote the same or similar components.

DETAILED DESCRIPTION

The terms as used in this disclosure are provided to merely describe specific embodiments, not to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding other embodiments of the disclosure.

Figure 1:
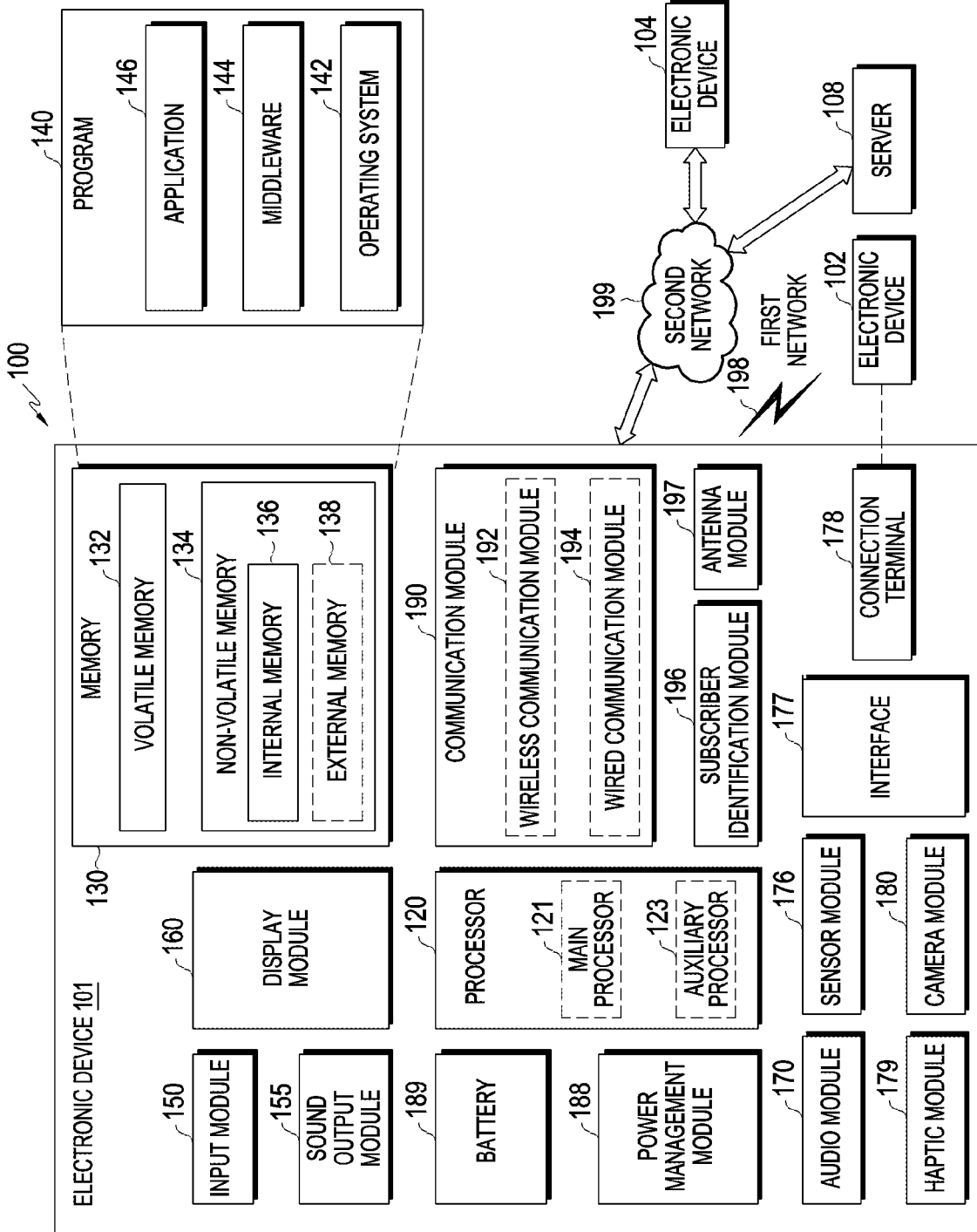
FIG. 1 is a block diagram illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least a part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least a part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least a part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
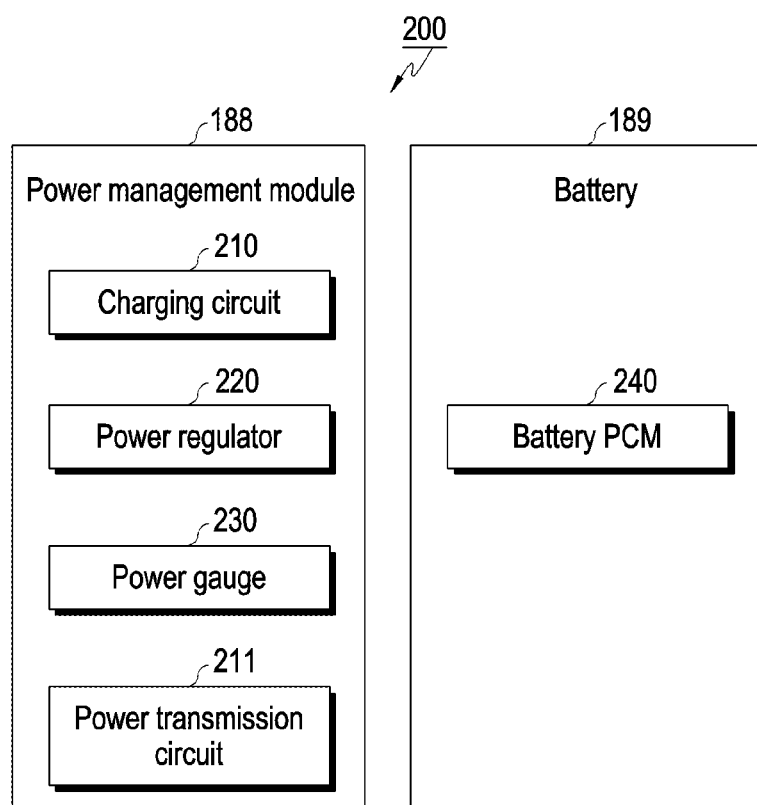
FIG. 2 is a block diagram illustrating a power management module and a battery according to an embodiment.

FIG. 2 is a block diagram 200 illustrating the power management module 188 and the battery 189 according to an embodiment.

Referring to FIG. 2, the power management module 188 may include a charging circuit 210, a power regulator 220, or a power gauge 230 (or a fuel gauge). The charging circuit 210 may charge the battery 189 with power supplied from an external power source for the electronic device 101. According to an embodiment, the charging circuit 210 may select a charging method (e.g., normal charging or rapid charging) based on at least some of the type of an external power source (e.g., a power adapter, a USB, or wireless charging), the magnitude (e.g., 20 watts or more) of power suppliable from the external power source, or the property of the battery 189, and charge the battery 189 using the selected charging method. The external power source may be coupled to the electronic device 101, for example, by a cable through the connection terminal 178 or wirelessly through the antenna module 197. For example, the charging circuit 210 may charge the battery 189 with power wirelessly received from the external electronic device 102.

The power regulator 220 may, for example, generate power having different voltage levels or different current levels by adjusting the voltage level or current level of power received from the external power source or the battery 189. The power regulator 220 may adjust the power of the external power source or the battery 189 to a voltage level or current level suitable for each of some of the components included in the electronic device 101. According to an embodiment, the power regulator 220 may be implemented in the form of a low drop out (LDO) regulator or a switching regulator. The power gauge 230 may measure use state information about the battery 189 (e.g., the capacity, number of times of charging and discharging, voltage, or temperature of the battery 189).

The power management module 188 may, for example, determine charging state information (e.g., a lifetime, overvoltage, undervoltage, overcurrent, overcharge, over discharge, overheat, short circuit, or swelling) related to charging of the battery 189 based on at least a part of the measured use state information, using the voltage regulator 220 or the power gauge 230. The power management module 188 may determine whether the battery 189 is normal or abnormal based at least a part of the determined charging state information. When determining that the state of the battery 189 is abnormal, the power management module 188 may adjust charging of the battery 189 (e.g., decrease a charging current or voltage or discontinue the charging). According to an embodiment, at least some of the functions of the power management module 188 may be performed by an external control device (e.g., the processor 120).

The battery 189 may include a battery protection circuit module (PCM) 240 according to an embodiment. The battery protection circuit 240 may perform one or more of various functions (e.g., a pre-blocking function) to prevent performance deterioration or burnout of the battery 189. Additionally or alternatively, the battery PCM 240 may be configured as at least a part of a battery management system (BMS) capable of performing various functions including cell balancing, battery capacity measurement, measurement of the number of times of charging and discharging, temperature measurement, or voltage measurement.

According to an embodiment, at least a part of the use state information or charging state information about the battery 189 may be measured using a corresponding sensor (e.g., a temperature sensor) of the sensor module 176, the power gauge 230, or the power management module 188. According to an embodiment, the sensor (e.g., the temperature sensor) of the sensor module 176 may be included as a part of the battery PCM 240, or disposed as a separate device in the vicinity of the battery 189.

According to an embodiment, the power management module 188 may further include a power transmission circuit 211. The power transmission circuit 211 may include a power adapter that receives a power voltage (or power) from the battery 189 and appropriately converts the received power voltage, a power generation circuit that generates power, and/or a matching circuit that wirelessly transmits the generated power to an external electronic device (e.g., the electronic device 102 of FIG. 1). The power transmission circuit 211 may transmit the generated power to the external electronic device by maximizing the efficiency between a transmission coil and a reception coil of the external electronic device through the matching circuit.

According to various embodiments, the external electronic device 102 may include the same components as included in the electronic device 101, and wirelessly supply power to the electronic device 101.

Figure 3A:
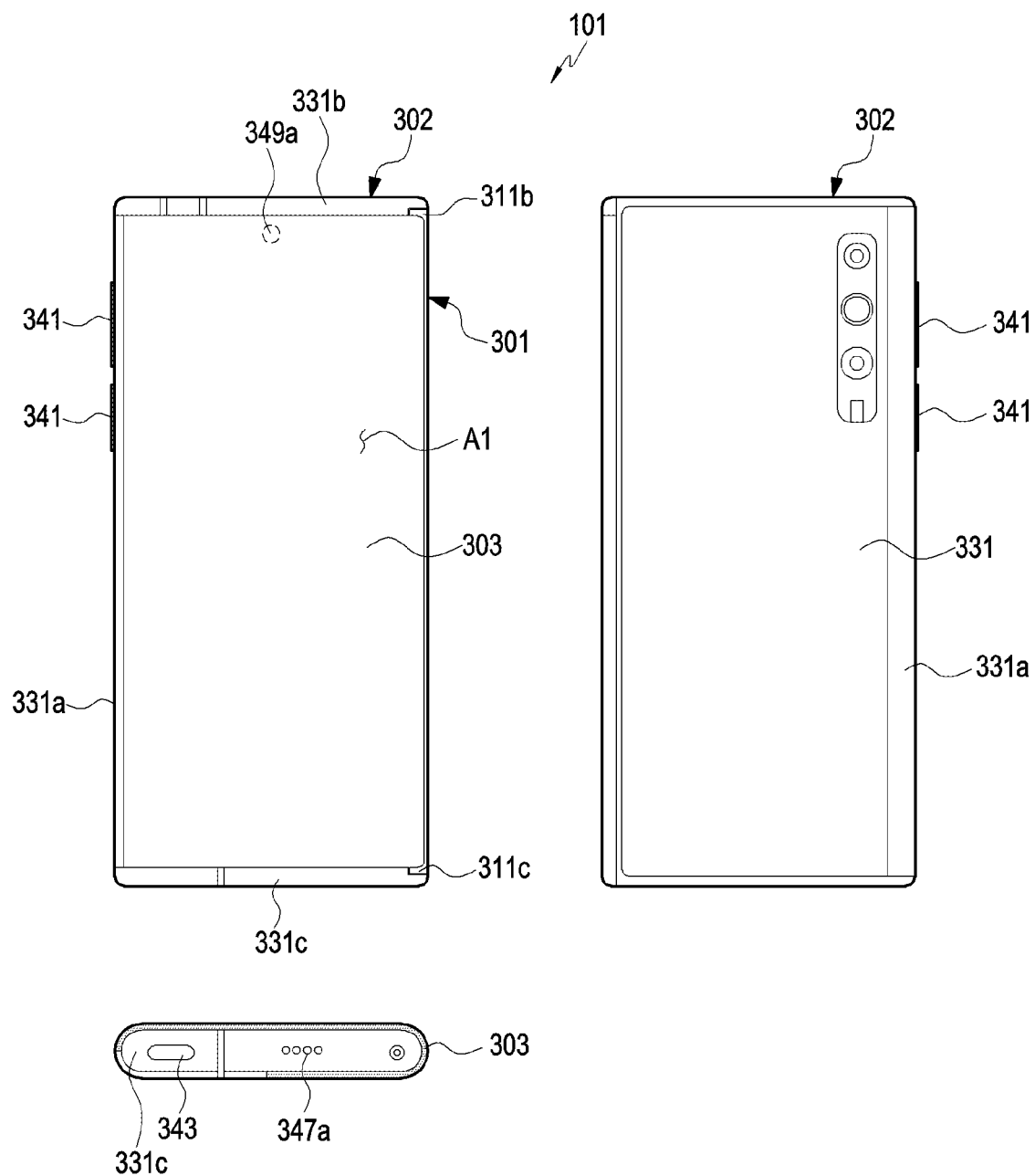
FIG. 3A is a diagram illustrating a state in which a second display area of a flexible display is accommodated in a second housing according to an embodiment.
Figure 3B:
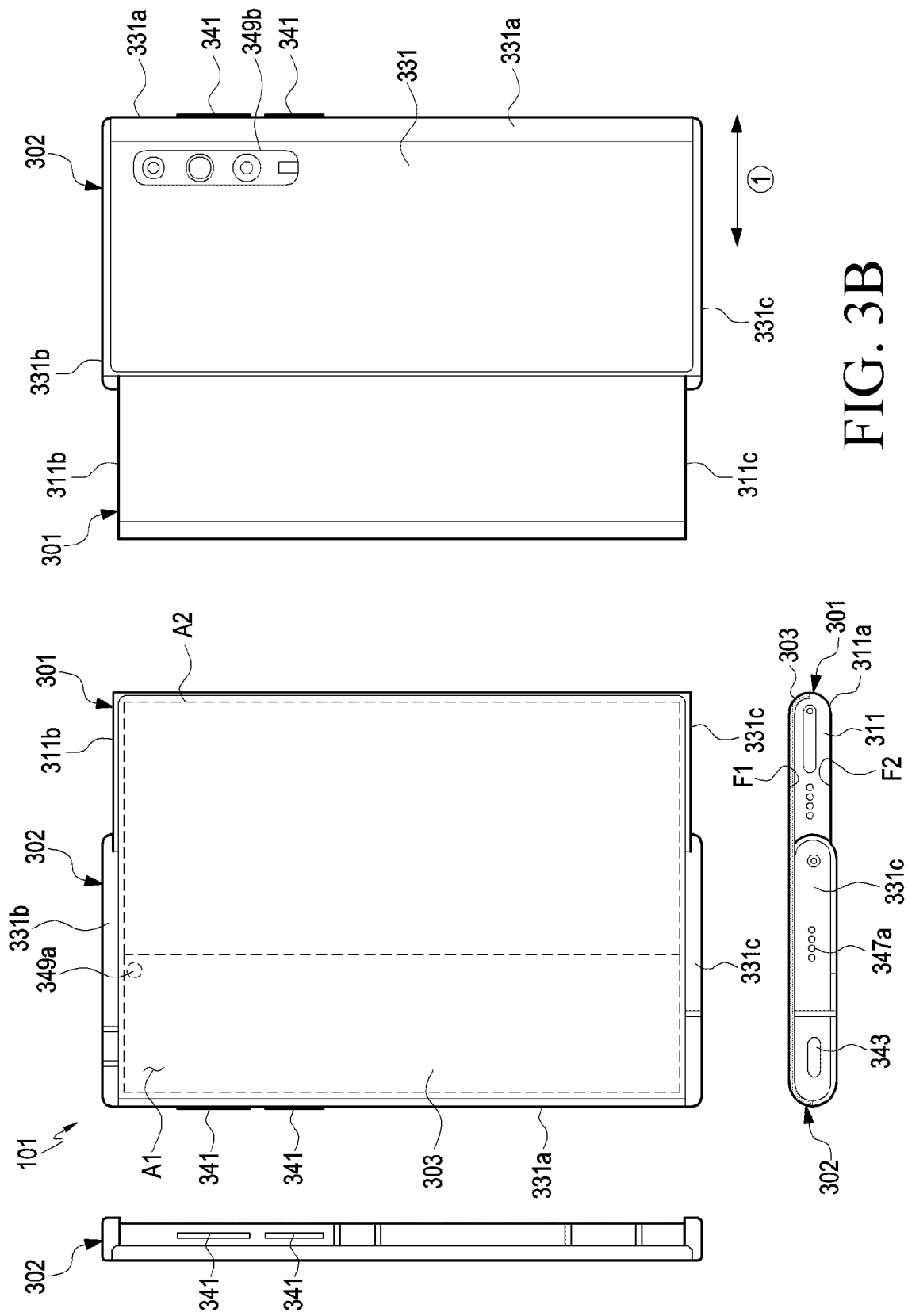
FIG. 3B is a diagram illustrating a state in which the second display area of the flexible display is exposed outward from the second housing according to an embodiment.

FIG. 3A is a diagram illustrating a state in which a second display area of a flexible display is accommodated in a second housing according to an embodiment. FIG. 3B is a diagram illustrating a state in which the second display area of the flexible display is exposed outward from the second housing according to an embodiment. FIGS. 3A and 3B illustrate a structure extending in the right direction of a flexible display 303, when viewed from the front of the electronic device 101. The state illustrated in FIG. 3A may, for example, correspond to closing a first housing 301 with respect to a second housing 302, and the state illustrated in FIG. 3B may, for example, correspond to opening the first housing 302 with respect to the second housing 302. According to an embodiment, a "closed state" or an "open state" may be defined as a state in which the electronic device is closed or opened.

Referring to FIGS. 3A and 3B, the electronic device 101 may include the housings 301 and 302. The housings 301 and 302 may include a second housing 302, and a first housing 301 disposed movably with respect to the second housing 302. In various embodiments, this configuration may refer, for example, to a structure in which the second housing 302 is slidably disposed on the first housing 301 in the electronic device 101. According to an embodiment, the first housing 301 may be disposed to reciprocate with respect to the second housing 302 by a certain distance in illustrated directions, for example, directions indicated by arrows ①. The configuration of the electronic device 101 illustrated FIGS. 3A and 3B may be wholly or partially identical to that of the electronic device 101 illustrated in FIG. 1.

According to an embodiment, the first housing 301 may be referred to as, for example, a first structure, a slide unit, or a slide housing, and may be reciprocally disposed on the second housing 302. According to an embodiment, the first housing 301 may accommodate various electric and electronic components such as a circuit board or a battery. The second housing 302 may be referred to as, for example, a second structure, a main unit, or a main housing, and may guide movement of the first housing 301. A part (e.g., a first display area A1) of the display 303 may be mounted in the first housing 301. According to an embodiment, as the first housing 301 moves (e.g., slides) with respect to the second housing 302, the other part (e.g., a second display area A2) of the display 303 may be accommodated inside the second housing 302 (e.g., a slide-in operation) or exposed outward from the second housing 302 (e.g., a slide-out operation). According to an embodiment, a motor, a speaker, a SIM socket, and/or a sub-circuit board electrically coupled to a main circuit board may be disposed in the first housing 301. The main circuit board on which electrical components such as an AP or a CP are mounted may be disposed in the second housing 302.

According to an embodiment, the first housing 301 may include a first plate 311 (e.g., a slide plate). The first plate 311 may include a first surface (e.g., a first surface F1 of FIG. 3B) forming at least a part of the first plate 311 and a second surface F2 facing the opposite direction of the first surface F1. According to an embodiment, the first plate 311 may support at least a part (e.g., the first display area A1) of the display 303. According to an embodiment, the first housing 301 may include the first plate 311, a $(1-1)^{th}$ sidewall 311a extending from the first plate 311, a $(1-2)^{th}$ sidewall 311b extending from the first plate 311 and the sidewall 311a, and a $(1-3)^{th}$ sidewall 311c extending from the first plate 311 and the sidewall 311a, and parallel to the sidewall 311b.

According to an embodiment, the second housing 302 may include a second plate 331 (a main case), a $(2-1)^{th}$ sidewall 331a extending from the second plate 331, a $(2-2)^{th}$ sidewall 331b extending from the second plate 331 and the sidewall 331a, and a $(2-3)^{th}$ sidewall 331c extending from the sidewall 331a and the second plate 331, and parallel to the sidewall 331b. According to an embodiment, the sidewall 331b and the sidewall 331c may be formed to be perpendicular to the sidewall 331a. According to an embodiment, the second plate 331, the sidewall 331a, the sidewall 331b, and the sidewall 331c may be formed into a shape open at a portion (e.g., a front surface) to accommodate at least a part of the first housing 301. For example, the first housing 301 may be coupled with the second housing 302, at least partially surrounded by the second housing 302, and may make a sliding movement in directions parallel to the first surface F1 or the second surface F2, for example, in the directions indicated by the arrows ①. According to an embodiment, the second plate 331, the sidewall 331a, sidewall 331b, and/or the sidewall 331c may be integrally formed. According to an embodiment, the second plate 331, the sidewall 331a, the sidewall 331b, and/or the sidewall 331c may be formed as separate housings and combined or assembled.

According to an embodiment, the second plate 331 and/or the sidewall 331a may cover at least a part of the flexible display 303. For example, at least a part of the flexible display 303 may be accommodated inside the second housing 302, and the second plate 331 and/or the sidewall 331a may cover the part of the flexible display 303 accommodated inside the second housing 302.

According to various embodiments, the first housing 301 may move in first directions (e.g., the directions ①) parallel to the sidewall 331b or the sidewall 331c to be in the open state and the closed state with respect to the second housing 302, and may be located at a first distance from the sidewall 331a in the closed state and at a second distance larger than the first distance from the sidewall 331a in the open state. In various embodiments, when placed in the closed state, the first housing 301 may surround a part of the sidewall 331a.

According to an embodiment, the electronic device 101 may include the display 303, key input devices 341, a connector hole 343, audio modules 347a, or camera modules 349a and 349b. While not shown, the electronic device 101 may further include an indicator (e.g., a light emitting diode (LED) device) or various sensor modules. The configurations of the display 303, the audio modules 347a, and the camera modules 349a and 349b of FIGS. 3A and 3B may be wholly or partially identical to those of the display module 160, the audio module 170, and the camera module 180 of FIG. 1.

According to various embodiments, the display 303 may include the first display area A1 and the second display area A2. According to an embodiment, the first display area A1 may be disposed on the first housing 301. For example, the first display area A1 may extend substantially across at least a part of the first surface F1 to be disposed on the first surface F1. The second display area A2 may extend from the first display area A1 and be inserted or accommodated into the second housing 302 (e.g., a structure) or exposed outward from the second housing 302, according to the sliding movement of the first housing 301.

According to various embodiments, the second display area A2 may move substantially under the guidance of an area (e.g., a curved surface 312 of FIG. 5) of the first housing 301 to be accommodated into or exposed outward from the second housing 302 or a space formed between the first housing 301 and the second housing 302. According to an embodiment, the second display area A2 may move based on the sliding movement of the first housing 301 in the first directions (e.g., the directions indicated by the arrows ①). For example, while the first housing 301 is making a sliding movement, a part of the second display area A2 may be deformed into a curved shape at a position corresponding to the curved surface 312 of the first housing 301.

According to various embodiments, when the first housing 301 moves from the closed state to the open state, the second display area A2 may form substantially a flat surface with the first display area A1, while being exposed gradually outward from the second housing 302, when viewed from above the first housing 301 (e.g., the slide plate). The display 303 may be coupled with or disposed adjacent to a touch sensing circuit, a pressure sensor capable of measuring the intensity (pressure) of a touch, and/or a digitizer that detects a magnetic field type stylus pen. In an embodiment, the second display area A2 may be at least partially accommodated inside the second housing 302, and even in the state (e.g., the closed state) illustrated in FIG. 3A, a part of the second display area A2 may be visually exposed to the outside. According to an embodiment, irrespective of the closed state or the open state, a part of the exposed second display area A2 may be located on a part (e.g., the curved surface 312 of FIG. 5) of the first housing 301, and a part of the second display area A2 may be maintained curved at a position corresponding to the curved surface 312.

According to an embodiment, the electronic device 101 may include at least one hinge structure. The hinge structure may couple the first housing 301 and the second housing 302 to each other. For example, the hinge structure may be coupled to the first plate 311 and the second plate 331. According to an embodiment, the hinge structure may transmit a driving force for guiding the sliding movement of the first housing 301 to the first housing 301. For example, the hinge structure may include an elastic material (e.g., a spring) and provide an elastic force in the first directions (e.g., the directions ① in FIG. 3B) based on the sliding movement of the first housing 301. According to an embodiment, the hinge structure may be excluded.

According to an embodiment, the key input devices 341 may be located in one area of the first housing 301. Depending on the appearance and use state, the electronic device 101 may be designed to be without the illustrated key input devices 341 or to include additional key input device(s). According to an embodiment, the electronic device 101 may include a key input device which is not shown, for example, a home key button or a touch pad disposed around the home key button. According to an embodiment, at least some of the key input devices 341 may be disposed on the sidewall 331a, the sidewall 331b, or the sidewall 331c of the second housing 302.

According to various embodiments, the connector hole 343 may be omitted in various embodiments, and may accommodate a connector (e.g., a USB connector) for transmitting and receiving power and/or data to and from an external electronic device. While not shown, the electronic device 101 may include a plurality of connector holes 343, and some of the plurality of connector holes 343 may function as connector holes for transmitting and receiving audio signals to and from an external electronic device. While the connector hole 343 is disposed on the sidewall 331c in the illustrated embodiment, the disclosure is not limited thereto, and the connector hole 343 or a connector hole which is not shown may be disposed on the sidewall 331a or the sidewall 331b.

According to various embodiments, the audio modules 347a may include at least one speaker hole or at least one microphone hole. One of the speaker holes may be provided as a receiver hole for a voice call, and the other may be provided as an external speaker hole. The electronic device 101 may include a microphone for obtaining sound, and the microphone may obtain sound from the outside of the electronic device 101 through the microphone hole. According to an embodiment, the electronic device 101 may include a plurality of microphones to detect the direction of sound. According to an embodiment, the electronic device 101 may include an audio module in which the speaker hole and the microphone hole are implemented as a single hole, or a speaker (e.g., a piezo speaker) in which the speaker hole is excluded.

According to various embodiments, the camera modules 349a and 349b may include a first camera module 349a and a second camera module 349b. The second camera module 349b may be located in the second housing 302 and capture a subject in a direction opposite to the first display area A1 of the display 303. The electronic device 101 may include a plurality of camera modules 349a and 349b. For example, the electronic device 101 may include at least one of a wide-angle camera, a telephoto camera, or a close-up camera, and according to an embodiment, may include an IR projector and/or an IR receiver to measure the distance to the subject. The camera modules 349a and 349b may include one or more lenses, an image sensor, and/or an image signal processor. The first camera module 349a may be disposed to face the same direction as the display 303. For example, the first camera module 349a may be disposed around the first display area A1 or in an area overlapping with the display 303, and when disposed in the area overlapping with the display 303, the first camera module 349a may capture the subject through the display 303.

According to various embodiments, an indicator (not shown) of the electronic device 101 may be disposed in the first housing 301 or the second housing 302, and include an LED to provide state information about the electronic device 101 as a visual signal. A sensor module (not shown) of the electronic device 101 may generate an electrical signal or data value corresponding to an internal operating state of the electronic device 101 or an external environmental state. The sensor module may include, for example, a proximity sensor, a fingerprint sensor, or a biometric sensor (e.g., an iris/face recognition sensor or a heart rate monitor (HRM) sensor). In an embodiment, the sensor module may further include, for example, at least one of a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

According to an embodiment, the first housing 301 may include the first plate 311 and a slide cover (not shown). The first plate 311 and the slide cover (not shown) may be mounted in (e.g., at least partially coupled to) the second housing 302 and linearly reciprocate in directions (the directions of the arrows ①) under the guidance of the second housing 302. According to an embodiment, the first plate 311 may support the display 303. For example, the first plate 311 may include the first surface F1, and the first display area A1 of the display 303 may be substantially located on the first surface F1 to be maintained in the shape of a flat plate. The slide cover may protect the display 303 located on the first plate 311. For example, at least a part of the display 303 may be located between the first plate 311 and the slide cover. According to an embodiment, the first plate 311 and the slide cover may be formed of or include a metal material and/or a non-metal (e.g., polymer) material. According to an embodiment, the first plate 311 may accommodate at least some (e.g., the battery 189 of FIG. 1), a motor 430 of FIG. 4, and a rack 410 of FIG. 4) of the components of the electronic device 101.

According to various embodiments, at least one board or a plurality of boards may be accommodated in the second housing 302. For example, the second housing 302 may include a circuit board (or main circuit board) 304 (see FIG. 4), and a processor, a memory, and/or an interface may be mounted on the main circuit board 304. The processor may include, for example, at least one of a central processing unit (CPU), an application processor, a graphics processing unit, an image signal processor, a sensor hub processor, or a communication processor. According to various embodiments, the circuit board 304 may include a flexible printed circuit board-type radio frequency cable (FRC). For example, the circuit board 304 may be disposed on at least a part of the second plate 331, and electrically coupled to an antenna module (e.g., the antenna module 197 of FIG. 1) and a communication module (e.g., the communication module 190 of FIG. 1).

According to an embodiment, the memory may include, for example, volatile memory or non-volatile memory.

According to an embodiment, the interface may include, for example, an HDMI, a USB interface, an SD card interface, and/or an audio interface. The interface may, for example, electrically or physically couple the electronic device 101 to an external electronic device, and include a USB connector, an SD card/multimedia card (MMC) connector, or an audio connector.

According to an embodiment, the electronic device 101 may further include a separate sub-circuit board 390 (see FIG. 4) spaced apart from the circuit board 304 in the second housing 302. The sub-circuit board 390 may be electrically coupled to the circuit board 304 through a connecting flexible board 391. The sub-circuit board 390 may be electrically coupled to a battery or electronic components disposed in an edge area of the electronic device, such as a speaker and/or a SIM socket, to transmit signals and power.

According to an embodiment, the battery, which is a device for supplying power to at least one component of the electronic device 101, may include, for example, a non-rechargeable primary battery, a rechargeable secondary battery, or a fuel cell. At least a part of the battery may be disposed substantially on the same plane with, for example, the circuit board 304. The battery may be integrally disposed inside the electronic device 101, or disposed detachably from the electronic device 101.

According to an embodiment, the battery may be formed as one integrated battery or may include a plurality of separate batteries. For example, when the integrated battery is located on the first plate 311, it may move along with the sliding movement of the first plate 311. In another example, when the integrated battery is located on the second plate 331, it may be fixedly disposed on the second plate 331, regardless of the sliding movement of the first plate 311. In an embodiment, when a first battery among removable batteries is located on the first plate 311, and a second battery among the removable batteries is fixedly located on the second plate 331, only the first battery may move along with the slide movement of the first plate 311. According to an embodiment, the electronic device 101 may further include a third plate 323 (see FIG. 5) coupled with an outer surface of the second plate 331. The third plate 323 may substantially form at least a part of the second housing 302 or the exterior of the electronic device 101. For example, the third plate 323 may be coupled to the outer surface of a second plate cover 322. According to an embodiment, the third plate 323 may be formed integrally with the second plate cover 322. According to an embodiment, the third plate 323 may provide a decorative effect on the exterior of the electronic device 101. According to an embodiment, the electronic device 101 may include a rack (e.g., the rack 410 of FIG. 4) disposed in the second housing 302 (e.g., the second plate 331), and guiding the sliding movement of the first housing 301 (e.g., the first plate 311), and a motor (e.g., the motor 430 of FIG. 4) transmitting a driving force to a gear 420 for rotational movement along the rack.

Figure 4:
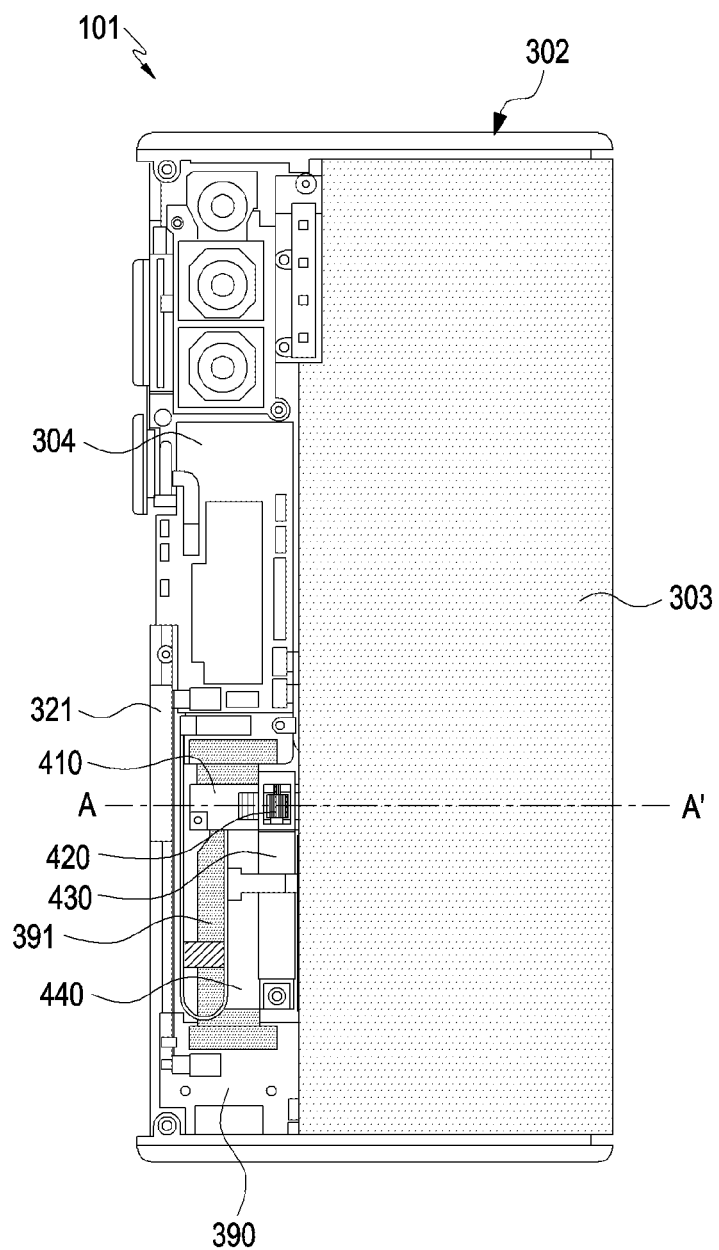
FIG. 4 is a rear view illustrating a structure with a cover of the second housing removed therein in a closed state of the electronic device according to an embodiment.
Figure 5:
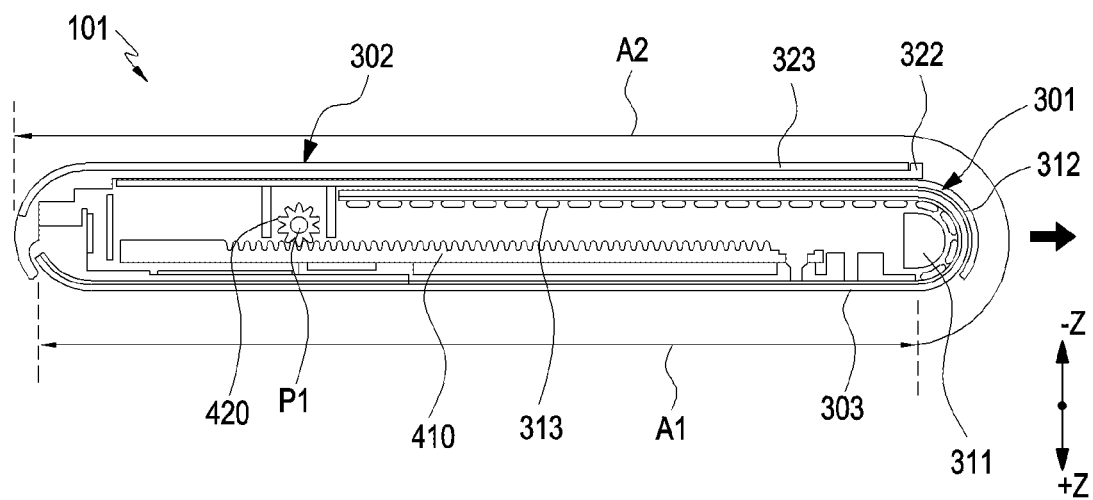
FIG. 5 is a sectional view taken along line A-A' of FIG. 4; according to an embodiment.

FIG. 4 is a rear view illustrating a structure with a cover of the second housing partially removed therein in the closed state of the electronic device according to an embodiment, and FIG. 5 is a sectional view taken along line A-A' of FIG. 4 according to an embodiment.

Referring to FIGS. 4 and 5, a projection view of internal components with an external rear cover (e.g., the third plate 323) of the electronic device 101 removed according to an embodiment is illustrated. The internal components of the electronic device 101 according to an embodiment may include components (e.g., a camera module, a battery, and other modules or components) corresponding to various components illustrated in FIG. 1, and a driving structure.

Referring to FIGS. 4 and 5, as the first housing 301 and the flexible display 303 coupled to the first housing 301 slide in with respect to the second housing 302 through the driving structure, the closed state may be obtained. On the contrary, as the first housing 301 and the flexible display 303 coupled to the first housing 301 slide out with respect to the second housing 302 through the driving structure, the open state may be obtained.

The driving structure according to an embodiment may perform a driving operation for automatically or semi-automatically providing a slide operation (a slide in or slid-out operation) of the display 303 in the electronic device 101. For example, when the user presses an open trigger button (e.g., a key input device 341 of FIG. 3A) exposed outward from the electronic device 101, the display 303 may automatically slide in or out (an automatic operation). In another example, when the user slides out the display 303 of the electronic device 101 by pushing the display 303 up to a specified section, the remaining section may be completely slide out by the force of an elastic member mounted in the electronic device 101 (a semi-automatic operation). The slide-in operation of the electronic device 101 may also be performed to correspond to the slide-out operation (a semi-automatic operation).

Referring to FIGS. 4 and 5, the driving structure according to an embodiment may include the motor 430, the gear 420 mounted at an end of the motor 430, the rack 410, and a connecting board 440 electrically coupled to the motor 430. The motor 430 according to an embodiment may be disposed in the first housing 301 to be slidable with respect to the second housing 302. The motor 430 may transmit a driving force to the gear 420 coupled to the end of the motor 430. The motor 430 according to an embodiment may be disposed so as not to overlap with the second display area A2 of the display 303. For example, an axis P1 of the gear 420 mounted at an end of the motor 430 may be disposed perpendicularly to a sliding movement direction, and although one surface of the motor 430 facing a +Z-axis direction overlaps with the first display area A1, one surface of the motor 430 facing a −Z-axis direction may be disposed so as not to overlap with the second display area A2, regardless of slide-in/slide-out of the display 303. The surface of the motor 430 facing the −Z-axis direction may face the first housing 301 in the slide-in state of the display 303, and face the second housing 302 in the slide-out state of the display 303.

According to an embodiment, considering the repulsive force of the flexible display, the motor 430 may provide a specified thrust (force) (e.g., a force of about 3 kgf), and the motor 430 may have a specified diameter (e.g., about 6.2 T or larger) to provide the force.

According to an embodiment, the motor 430 may be disposed in parallel with at least a part of the battery and electrically coupled to the connecting board 440 disposed adjacent to the motor 430.

According to an embodiment, the rack 410 may be disposed in the second housing 302, and guide the sliding movement of the first housing 301 and the display 303. The rack 410 may be fixedly disposed on one surface (e.g., the surface facing the −Z axis) of the second plate 331 of the second housing 302, and guide the gear 420 such that the gear 420 may make a rotational movement in a sliding movement direction. At least a part of one surface of the rack 410 facing the −Z-axis direction may face the second display area A2 in the slide-in state of the display 303, and may not face the second display area A2 in the slide-out state of the display 303.

According to an embodiment, the rack 410 may be disposed not to overlap with the battery. According to an embodiment, the gear 420 may be located on the axis P1, and slide the first housing 301 and the display 303 while rotationally moving along the rack 410. When the first housing 301 slides by the rotation of the gear 420, a component (hereinafter, referred to as a first electrical component) mounted in the first housing 301 may also slide. For example, the first electrical component may be at least one of the motor 430, a component disposed on the connecting board 440, a speaker, or a SIM socket. In an embodiment, the first electrical component may be a battery. In the case of removable batteries, the first electrical component may be at least one of the removable batteries.

According to an embodiment, the connecting board 440 may be disposed adjacent to the motor 430 and/or the rack 410 in the first housing 301. The connecting board 440 may be configured to be electrically coupled to the main circuit board 304 disposed in the second housing 302. The main circuit board 304 may have an electrical structure (e.g., a processor) mounted thereon to control driving of the motor 430 or to supply power to the motor 430. The connecting board 440 may be electrically coupled to the main circuit board 304 to control driving of the motor 430 or transmit a signal for controlling power. According to an embodiment, the connecting board 440 and the main circuit board 304 may be rigid boards, and the electronic device 101 may further include a separate connecting flexible printed circuit board (FPCB) for coupling the connecting board 440 to the main circuit board 304. According to an embodiment, power from a separate battery disposed adjacent to the motor 430 may be supplied directly through the connecting board 440. According to an embodiment, the connecting board 440 coupled to the motor 430 may be disposed in the first housing 301 and move together along with the sliding movement of the first housing 301. The main circuit board 304 and the sub-circuit board 390 spaced apart from the main circuit board 304 may be disposed in the second housing 302. In addition, the connecting flexible board 391 may be disposed in the second housing 302 to electrically couple the main circuit board 304 and the sub-circuit board 390 to each other. The connecting flexible board 391 may have a connector disposed at each end thereof to form an electrical contact with the main circuit board 304 and the sub-circuit board 390, and may be disposed to at least partially overlap with the driving structure. For example, when the inside of the electronic device is projected toward the rear cover (e.g., the third plate), a top end of the connecting flexible board 391 and a part of the rack 410 may be disposed to overlap with each other.

Figure 6:
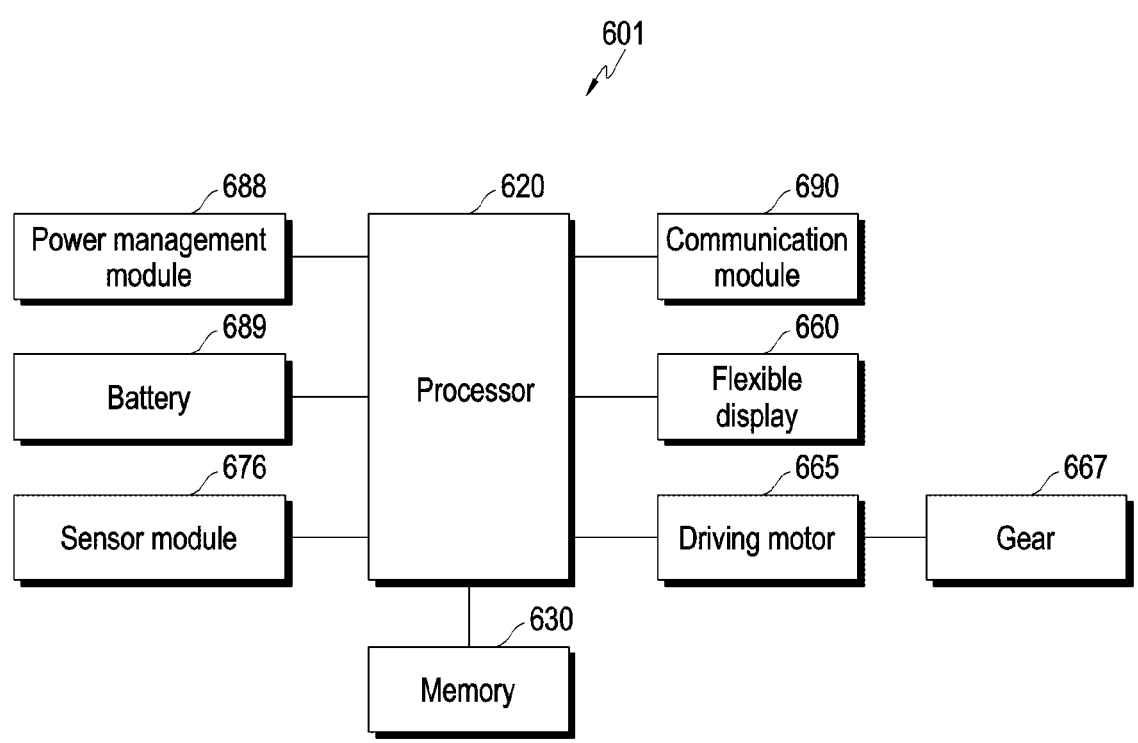
FIG. 6 is a block diagram illustrating an electronic device according to an embodiment.

FIG. 6 is a block diagram illustrating an electronic device according to an embodiment.

Referring to FIG. 6, an electronic device 601 (e.g., the electronic device 101 of FIG. 1) according to an embodiment may include a flexible display 660, a motor 665, a gear 667, a sensor module 676 (e.g., including at least one sensor), a power management module 688 (e.g., including power management circuitry), a battery 689, a communication module 690 (e.g., including communication circuitry), at least one processor 620 (e.g., including processing circuitry and hereinafter, referred to as a processor), and/or a memory 630. The electronic device 601 according to an embodiment is not limited thereto, and may be configured to further include various components or to be without some of the components. The electronic device 601 according to an embodiment may further include all or a part of the electronic device 101 illustrated in FIG. 1.

The flexible display 660 (e.g., the display 160 of FIG. 1 or the display 303 of FIGS. 3A, 3B, 4, and 5) according to an embodiment may be implemented in the form of a touch screen. When the flexible display 660 is implemented together with an input module in the form of a touch screen, it may display various pieces of information generated according to a user's touch action. According to an embodiment, the flexible display 660 may be configured to be rollable during a slide-in or slide-out operation. A screen of the flexible display 660 may contract or extend based on the slide-in or slide-out operation of the flexible display 660.

The motor 665 (e.g., the motor 430 of FIG. 4) according to an embodiment may be driven by receiving electric power (or current), and provide a driving force to the gear 667 (e.g., the gear 420 of FIG. 4) coupled to the motor 665. The motor 665 according to an embodiment may be implemented to provide a specified thrust (force) (e.g., a force of about 3 kgf) based on a repulsive (or opposing) force generated when the flexible display slides in or out. The motor 430 may have a specified diameter (e.g., equal to or larger than about 6.2 T) to provide the specified force. The gear 667 according to an embodiment may enable the flexible display 660 to slide in or out based on the driving force from the motor 665.

A sensor module 676 (e.g., the sensor module 176 of FIG. 1) according to an embodiment may include at least one sensor. According to an embodiment, the at least one sensor may include a temperature sensor, and further include other sensors required for identifying the state or use scenario of the electronic device 601. For example, the temperature sensor may sense the internal temperature of the electronic device 601 (e.g., at least one specified part or space inside the electronic device 601) and provide sensed temperature information to the processor 620.

The power management module 688 (e.g., the power management module 188 of FIGS. 1 and 2) according to an embodiment may manage power supplied to the electronic device 601. The power management module 688 according to an embodiment may charge the battery 689 with power supplied from an external power source for the electronic device 601. According to an embodiment, the power management module 688 may measure use state information about the battery 689 (e.g., the capacity, number of times of charging and discharging, voltage, or temperature of the battery 689). The power management module 688 according to an embodiment may determine charging state information related to charging of the battery 689 (e.g., a lifetime, overvoltage, undervoltage, overcurrent, overcharge, over discharge, overheat, short circuit, or swelling) based on at least part of the measured use state information. The power management module 688 may provide the use state information and the charging state information to the at least one processor 620. The power management module 688 according to an embodiment may include a battery current sensor, a battery voltage sensor, an internal consumption current sensor, and/or a component (or circuit, or module) having the functions of the battery current sensor, the battery voltage sensor, the internal consumption current sensor, and/or the battery capacity sensor, and provide battery current information, battery voltage information, internal consumption current information, and/or battery capacity information, sensed by each sensor to the processor 220. For example, the battery current sensor, the battery voltage sensor, and the battery capacity sensor may be included in or provided separately from a power gauge (e.g., the power gauge 230 of FIG. 2). For example, the battery current sensor may sense a current received from the battery 689 and provide sensed battery current information to the processor 620. The battery voltage sensor may sense the voltage of the battery 689 and provide sensed battery voltage information to the processor 620. The battery capacity sensor may sense the remaining capacity (or battery level) of the battery 689 and provide sensed remaining battery capacity information (or battery level) to the processor 620. For example, the internal consumption current sensor may be included in a power regulator (e.g., the power regulator 220 of FIG. 2) or may be provided separately. For example, the internal consumption current sensor may sense a consumption current consumed inside the electronic device 601 (e.g., a consumption current consumed in the entire electronic device 601, a current consumed in a specified component among the components included in the electronic device 601, or a current consumed for a function or operation being performed by the electronic device), and provide sensed internal consumption current information to the processor 620. According to an embodiment, at least some or all of the battery current sensor, the battery voltage sensor, the internal consumption current sensor, and/or the battery capacity sensor may be implemented as a single sensor and provided separately from the power management module 688.

The communication module 690 (e.g., the communication module 190 of FIG. 1) according to an embodiment may communicate with the external electronic device 104 through the first network 198 (a short-range communication network such as Bluetooth, WiFi direct, or IrDA) or the second network 199 (e.g., a legacy cellular network, a 5G network, a next-generation communication network (e.g., new radio (NR) access technology), the Internet, or a computer network (e.g., a telecommunication network such as a LAN or WAN) under the control of the at least one processor 620.

The processor 620 (e.g., the processor 120 of FIG. 1) according to an embodiment may provide overall control to the operations of the components included in the electronic device 601. The processor 620 according to an embodiment may identify a slide operation (a slide-in or slide-out operation) start event of the flexible display 660. For example, the processor 620 may identify (automatic) slide-in or slide-out start of the flexible display 660 based on the user's pressing an open trigger button (e.g., a key input device 341 of FIG. 3A) exposed outward from the electronic device 101. In another example, when the user slides out the flexible display 660 by pushing the electronic device 101 up to a specified section or slides in the flexible display 660 up to a specified section in a direction opposite to the slide-out direction in the slide-out state, the processor 620 may identify (semi-automatic) slide-in start.

The processor 620 according to an embodiment may identify a battery current, a battery voltage, an internal consumption current, a remaining battery capacity, and/or an electronic device temperature sensed through at least one sensor, based on the occurrence of the slide operation start event of the display 660. In addition to the battery current, the battery voltage, the internal consumption current, the remaining battery capacity, and/or the electronic device temperature, the processor 620 according to an embodiment may further identify use scenario information (e.g., high-power communication (e.g., 5G communication), power supply to an external device, or on-the-go (OTG) device connection).

The processor 620 according to an embodiment may control the speed of the motor 665 or restrict an operation of the motor 665 based on at least one or more or all of the battery current, the battery voltage, the internal consumption current, the remaining battery capacity, and the electronic device temperature. The processor 620 according to an embodiment may control the speed of the motor 665 or restrict the operation of the motor 665 based on high-power communication (e.g., 5G communication) or whether charging power is supplied, in addition to at least one or more or all of the battery current, the battery voltage, the internal consumption current, the remaining battery capacity, and the electronic device temperature. According to an embodiment, the processor 620 may control the speed of the motor 665 to one of a plurality of different speeds or may lock the motor 665 not to be driven. For example, the plurality of speeds may include first to fourth speeds. The first speed may include a speed (e.g., a very low speed) equal to or lower than (or lower than) a specified speed, the second speed may include a speed (e.g., a low speed) higher than the first speed and lower than the third speed, the third speed may include a speed (e.g., a general speed) higher than the second speed and lower than the fourth speed, and the fourth speed may include a speed (e.g., a high speed) higher than the third speed. According to an embodiment, the general speed, which is a normal speed, may be obtained by accumulating and learning speeds specified (used) by the user or predetermined in the process of manufacturing the electronic device 601. According to an embodiment, when powered on, the electronic device 601 may automatically set the speed of the motor 430 to the general speed, and upon occurrence of a slide operation start event, adjust the general speed to the first speed, the second speed, or the fourth speed according to each state.

The processor 620 according to an embodiment may identify (or determine or set or control) the speed of the motor 665 based on a speed control table stored in the memory 630 or identify discontinuation of the driving of the motor 665, and control the magnitude of power supplied to the motor 665 based on the identified speed or the driving discontinuation. For example, when the driving is discontinued, the power supply may be stopped, and as the speed increases, the magnitude of supplied power may be increased.

Table 1 below lists an example of a plurality of speeds for the motor 665 according to states of the electronic device according to an embodiment.

TABLE 1

| State of electronic device | Speed of motor |
| --- | --- |
| OCP warning state or SMPL warning state | First speed or driving discontinuation |
| Heat state or state in which remaining battery capacity is equal to or less than specified capacity | Second speed |
| 5G connection state, state of supplying power to the outside, or OTG device connection state | Third speed |
| None of the above states | Fourth speed |

Referring to Table 1, an overcurrent protection (OCP) warning state according to an embodiment may be a state in which, when a battery current flowing from the battery 689 into the electronic device (or at least one component of the electronic device, or some module or circuit of the electronic device) is larger than a specified battery current threshold, the circuit or battery of the electronic device may be damaged due to the overcurrent flow inside the electronic device. The processor 620 according to an embodiment may receive the battery current flowing from the battery 689 into the electronic device (or at least one component of the electronic device, or some module or circuit of the electronic device), measured through the power management module 688 or the battery current sensor, and identify the OCP warning state, when the battery current is greater than the specified battery current threshold. The processor 820 according to an embodiment may identify (or determine or set or control) the speed of the motor 665 as the first speed in the OCP warning state, or identify discontinuation of the driving of the motor 665.

According to an embodiment, the sudden momentary power loss (SMPL) warning state may be a state in which system power is down because a battery voltage is lowered to or below (or below) a specified voltage (e.g., about 2V). The processor 620 according to an embodiment may receive a battery voltage measured through the power management module 688 or the battery voltage sensor, and identify the SMPL warning state, when the battery voltage is equal to or lower than a specified voltage. The processor 620 according to an embodiment may identify (or determine or set or control) the speed of the motor 665 as the first speed in the SMPL warning state, or identify discontinuation of the driving of the motor 665.

The processor 620 according to an embodiment may identify a heat state, when the internal temperature of the electronic device is equal to or higher than (or exceeds) a specified temperature based on an electronic device temperature. The processor 620 according to an embodiment may identify (or determine or set or control) the speed of the motor 665 as the second speed in the heat state.

The processor 620 according to an embodiment may identify a state in which the remaining battery capacity is less than or equal to (or less than) a specified capacity (15% of the total capacity of the battery) based on a remaining battery capacity. The processor 620 according to an embodiment may identify (or determine or set or control) the speed of the motor 665 as the second speed in the state in which the remaining battery capacity is equal to or less than the specified capacity.

The processor 620 according to an embodiment may receive an internal consumption current measured through the power management module 688 or the internal consumption current sensor, and identify a state in which the internal consumption current is equal to or larger than (or exceeds) a specified internal consumption current threshold, based on the internal consumption current.

The processor 620 according to an embodiment may identify (or determine or set or control) the speed of the motor 665 as the second speed in a state in which the internal consumption current is equal to or larger than the specified internal consumption current threshold.

The processor 620 according to an embodiment may identify whether the state of the electronic device 601 is the 5G connection state, the external power supply state, or the OTG device connection state. The processor 620 according to an embodiment may identify (or determine or set or control) the speed of the motor 665 as the third speed, when the state of the electronic device 601 is the 5G connection state, the external power supply state, or the OTG device connection state.

In a state other than the OCP warning state, the SMPL warning state, the heat state, the state in which the remaining battery capacity is less than or equal to the specified capacity, and/or the state in which the internal consumption current is equal to or greater than the specified internal consumption current threshold, and other than the 5G connection state, the state in which power is being supplied to the outside, and the state in which an OTG device is connected, the processor 620 may identify (or determine or set or control) the speed of the motor 665 as the fourth speed.

The memory 630 according to an embodiment may store an application program and data. For example, the memory 630 may store an application (a function or a program) associated with control of a motor driving speed and/or discontinuation of motor driving. According to an embodiment, the memory 630 may store information (e.g., Table 1) corresponding to a plurality of specified states and a driving speed for each of the plurality of states. The memory 630 according to an embodiment may store various data generated during execution of the program 140, as well as a program (e.g., the program 140 of FIG. 1) used for a functional operation. The memory 630 may largely include the program area 140 and a data area (not shown). The program area 140 may store program related program information for driving the electronic device 601, such as an OS (e.g., the OS 142 of FIG. 1) for booting the electronic device 601. The data area (not shown) may store transmitted and/or received data and generated data according to various embodiments. In addition, the memory 630 may be configured to include at least one storage medium of a flash memory, a hard disk, a multimedia card micro type memory (e.g., SD or extreme digital (XD) memory), random access memory (RAM), or read only memory (ROM).

According to an embodiment, the electronic device 601 is not limited to the configuration illustrated in FIG. 6, and may further include various components. According to an embodiment, the electronic device 601 may further include an image processing module (not shown). The image processing module may perform two-dimensional (2D) or three-dimensional (3D) image processing and/or rendering operations under the control of the processor 620.

In the above-described embodiment, the main components of an electronic device have been described in the context of the electronic device 601 of FIG. 6. However, in various embodiments, all of the components shown in FIG. 6 are not essential components, and the electronic device 601 may be implemented with more components or fewer components than the illustrated components.

According to various embodiments, an electronic device (e.g., the electronic device 101 of FIG. 1 or the electronic device 601 of FIG. 6) may include a first housing (e.g., the first housing 301 of FIGS. 3A and 3B), a second housing (e.g., the second housing 302 of FIGS. 3A and 3B) configured to accommodate at least a part of the first housing 301 and guide sliding movement of the first housing 301, a flexible display (e.g., the display 303 of FIGS. 3A and 3B or the flexible display 660 of FIG. 6) including a first display area A1 coupled to the first housing and a second display area A2 extending from the first display area, a gear (e.g., the gear 420 of FIG. 4) disposed inside the second housing and configured to move the flexible display, a motor (e.g., the motor 430 of FIG. 4) configured to rotate the gear, at least one sensor (e.g., the sensor module 176 of FIG. 1 or the sensor module 676 of FIG. 6), and at least one processor (e.g., the processor 120 of FIG. 1 or the processor 620 of FIG. 6). The at least one processor may be configured to identify a state of the electronic device including at least one of a battery current, a battery voltage, an internal consumption current, a battery level, or an electronic device temperature, based on information sensed through the at least one sensor, and control a speed of the motor or discontinue driving of the motor based on the identified state of the electronic device.

According to various embodiments, the at least one processor may be configured to further identify whether the electronic device performs specified communication, whether the electronic device supplies power to an external device, or whether the electronic device is connected to an OTG device, and control the speed of the motor or discontinue the driving of the motor further based on whether the electronic device performs the specified communication, whether the electronic device supplies power to the external device, or whether the electronic device is connected to the OTG device.

According to various embodiments, the at least one processor may be configured to identify an OCP warning state of the electronic device based on the battery current or identify an SMPL warning state based on the battery voltage, and control the speed of the motor to a first speed lower than a specified speed or discontinue the driving of the motor, in the OCP warning state or the SMPL warning state.

According to various embodiments, the at least one processor may be configured to identify a heat state, when an internal temperature of the electronic device is equal to or higher than a specified first temperature based on the electronic device temperature, and control the speed of the motor to a second speed lower than a specified speed or discontinue the driving of the motor, in the heat state.

According to various embodiments, the at least one processor may be configured to identify a low temperature state, when an internal temperature of the electronic device is lower than a specified second temperature based on the electronic device temperature, and control the speed of the motor to a second speed lower than a specified speed in the low temperature state.

According to various embodiments, the at least one processor may be configured to identify a state in which the battery level is equal to or lower than a specified level based on the battery level, and control the speed of the motor to a second speed lower than a specified speed or discontinue the driving of the motor, in the state in which the battery level is equal to or lower than the specified level.

According to various embodiments, the at least one processor may be configured to identify a state in which the internal consumption current is equal to or greater than a specified internal consumption current threshold, based on the internal consumption current, and control the speed of the motor to a second speed lower than a specified speed or discontinue the driving of the motor, in a state in which the internal consumption current is equal to or greater than the specified internal consumption current threshold.

According to various embodiments, the at least one processor may be configured to control the speed of the motor to a specified third speed, when the electronic device is performing a specified communication, is supplying power to the external device, or is connected to the OTG device in a state other than an OCP warning state, an SMPL warning state, a heat state, a state in which the battery level is equal to or lower than a specified level, and a state in which the internal consumption current is equal to or greater than a specified internal consumption current threshold.

According to various embodiments, the at least one processor may be configured to control the speed of the motor to a fourth speed higher than the specified third speed, when the electronic device is not performing a specified communication, is not supplying power to the external device, and is not connected to the OTG device in the state other than the OCP warning state, the SMPL warning state, the heat state, the state in which the battery level is equal to or lower than the specified level, and the state in which the internal consumption current is equal to or greater than the specified internal consumption current threshold.

Figure 7:
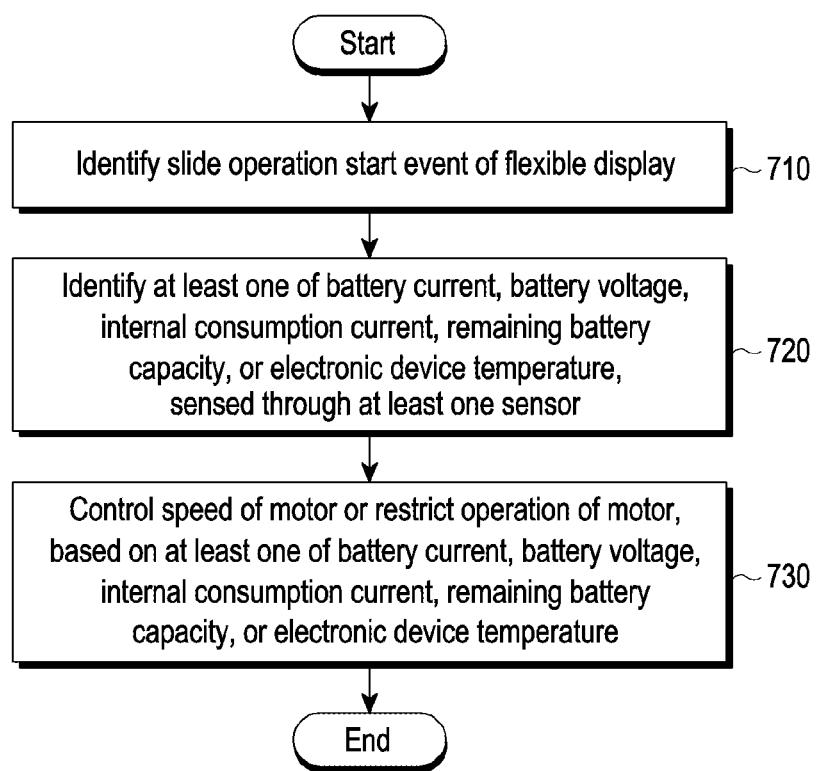
FIG. 7 is a flowchart illustrating a method of controlling motor driving in an electronic device including a flexible display according to an embodiment.

FIG. 7 is a flowchart illustrating a method of controlling motor driving in an electronic device including a flexible display according to an embodiment.

Referring to FIG. 7, a processor (e.g., the processor 120 of FIG. 1 or the processor 620 of FIG. 6) of an electronic device (e.g., the electronic device 101 of FIG. 1 or the electronic device 601 of FIG. 6) according to an embodiment may perform at least one of operations 710, 720 and 730.

In operation 710, the processor 620 according to an embodiment may identify a slide operation (slide-in or slide-out operation) start event of the flexible display 660. For example, the processor 620 may identify (automatic) slide-in or slide-out start of the flexible display 660 based on the user's pressing of an open trigger button (e.g., a key input device 341 of FIG. 3A and FIG. 3B) exposed outward from the electronic device 601. In another example, when the user slides out the flexible display 660 by pushing the electronic device 601 up to a specified section or slides in the flexible display 660 up to a specified section in a direction opposite to a slide-out direction in the slide-out state, the processor 620 may identify (semi-automatic) slide-in start.

In operation 720, the processor 620 according to an embodiment may identify a battery current, a battery voltage, an internal consumption current, a remaining battery capacity, and/or an electronic device temperature sensed through at least one sensor, based on the occurrence of the slide operation start event of the display 660. In addition to the battery current, the battery voltage, the internal consumption current, the remaining battery capacity, and/or the electronic device temperature, the processor 620 according to an embodiment may further identify use scenario information (e.g., high-power communication (e.g., 5G communication), power supply to an external device, or OTG device connection).

In operation 730, the processor 620 according to an embodiment may control the speed of the motor 665 or restrict (or discontinue) an operation of the motor 665 based on at least one or more or all of the battery current, the battery voltage, the internal consumption current, the remaining battery capacity, and the electronic device temperature. The processor 620 according to an embodiment may control the speed of the motor 665 or restrict the operation of the motor 665 based on high-power communication (e.g., 5G communication) or whether charging power is supplied, in addition to at least one or more or all of the battery current, the battery voltage, the internal consumption current, the remaining battery capacity, and the electronic device temperature.

According to an embodiment, the processor 620 may control the speed of the motor 665 to one of a plurality of different speeds or may lock the motor 665 not to be driven. For example, the plurality of speeds may include first to fourth speeds. The first speed may include a speed (e.g., a very low speed) equal to or lower than (or lower than) a specified speed, the second speed may include a speed (e.g., a low speed) higher than the first speed and lower than the third speed, the third speed may include a speed (e.g., a general speed) higher than the second speed and lower than the fourth speed, and the fourth speed may include a speed (e.g., a high speed) higher than the third speed.

The processor 620 according to an embodiment may identify, based on the battery current, a state in which, when a battery current flowing from the battery into the electronic device is equal to or greater than a specified threshold, a circuit or battery of the electronic device may be damaged due to the overcurrent flow in the electronic device (e.g., the OCP warning state). In the OCP warning state, the processor 620 according to an embodiment may identify (or determine or set or control) the speed of the motor 665 as the first speed or identify discontinuation of driving of the motor 665. The processor 620 according to an embodiment may identify, based on the battery voltage, a system power down state (e.g., the SMPL warning state) in which the internal voltage of the electronic device is lowered to or below (or below) a specified voltage (e.g., about 2V). In the SMPL warning state, the processor 620 according to an embodiment may identify (or determine or set or control) the speed of the motor 665 as the first speed or identify discontinuation of the driving of the motor 665. When the internal temperature of the electronic device is equal to or higher than (or exceeds) a specified temperature, based on the electronic device temperature, the processor 620 according to an embodiment may identify a heat state. In the heat state, the processor 620 according to an embodiment may identify (or determine or set or control) the speed of the motor 665 as the second speed or identify discontinuation of the driving of the motor 665. The processor 620 according to an embodiment may identify, based on the remaining battery capacity, a state in which the remaining battery capacity is equal to or less than (or less than) a specified capacity (15% of the total capacity of the battery). The processor 620 according to an embodiment may identify (or determine or set or control) the speed of the motor 665 as the second speed in the state in which the remaining battery capacity is equal to or less than the specified capacity. The processor 620 according to an embodiment may identify, based on the internal consumption current, a state in which the internal consumption current is equal to or greater than (or exceeds) a specified internal consumption current threshold. The processor 620 according to an embodiment may identify (or determine or set or control) the speed of the motor 665 as the second speed in a state in which the internal consumption current is equal to or greater than the specified internal consumption current threshold. The processor 620 according to an embodiment may identify a network connection state, a state in which power is being supplied to the outside, or a state in which an external device is connected. For example, the network connection state may be a state in which the electronic device 601 is connected to a 5G network or a state in which the electronic device 601 is connected to a 6G network, and/or a state in which the electronic device 601 is connected to an external server through the 5G and/or 6G network (e.g., a server with a specific IP address or a MEC edge computing server). For example, the state in which power is being supplied to the outside may include a state in which power is being transmitted to an external electronic device by a wireless method (e.g., a wireless resonance method) or a wired method (a USB power transmission method or a power cable power transmission method). The state in which an external device is connected may include a state in which an OTG device (e.g., an OTG keyboard or a USB device) is connected.

In the network connection (e.g., 5G connection) state, the state in which power is being supplied to the outside, or the state in which the electronic device is connected to an external device (an OTG device), the processor 620 according to an embodiment may identify (or determine or set or control) the speed of the motor 665 as the third speed. In a state other than the OCP warning state, the SMPL warning state, the heat state, the state in which the remaining battery capacity is less than or equal to the specified capacity, and/or the state in which the internal consumption current is equal to or greater than the specified internal consumption current threshold, and other than the 5G connection state, the state in which power is being supplied to the outside, and the state in which the OTG device is connected, the processor 620 may identify (or determine or set or control) the speed of the motor 665 as the fourth speed.

According to various embodiments, a method of controlling motor driving in an electronic device (e.g., the electronic device 101 of FIG. 1 or the electronic device 601 of FIG. 6) including a flexible display (e.g., the display 303 of FIG. 3A and FIG. 3B or the flexible display 660 of FIG. 6) may include identifying a slide operation start event of the flexible display, identifying at least one of a battery current, a battery voltage, an internal consumption current, a battery level, or an electronic device temperature based on information sensed through at least one sensor, based on the slide operation start event of the flexible display, and controlling a speed of a motor performing a slide operation of the flexible display or discontinuing driving of the motor, based on the at least one of the battery current, the battery voltage, the internal consumption current, the battery level, or the electronic device temperature.

According to various embodiments, the method may further include identifying whether the electronic device performs specified communication, whether the electronic device supplies power to an external device, or whether the electronic device is connected to an OTG device, and controlling the speed of the motor or discontinuing the driving of the motor further based on whether the electronic device performs the specified communication, whether the electronic device supplies power to the external device, or whether the electronic device is connected to the OTG device.

According to various embodiments, the method may further include identifying an OCP warning state of the electronic device based on the battery current or identifying an SMPL warning state based on the battery voltage, and controlling the speed of the motor to a first speed lower than a specified speed or discontinuing the driving of the motor, in the OCP warning state or the SMPL warning state.

According to various embodiments, the method may further include identifying a heat state, when an internal temperature of the electronic device is equal to or higher than a specified first temperature based on the electronic device temperature, and controlling the speed of the motor to a second speed lower than a specified speed or discontinuing the driving of the motor, in the heat state.

According to various embodiments, the method may further include identifying a low temperature state, when an internal temperature of the electronic device is lower than a specified second temperature based on the electronic device temperature, and controlling the speed of the motor to a second speed lower than a specified speed in the low temperature state.

According to various embodiments, the method may further include identifying a state in which the battery level is equal to or lower than a specified level based on the battery level, and controlling the speed of the motor to a second speed lower than a specified speed or discontinuing the driving of the motor, in the state in which the battery level is equal to or lower than the specified level.

According to various embodiments, the method may further include identifying a state in which the internal consumption current is equal to or greater than a specified internal consumption current threshold, based on the internal consumption current, and controlling the speed of the motor to a second speed lower than a specified speed or discontinuing the driving of the motor, in a state in which the internal consumption current is equal to or greater than the specified internal consumption current threshold.

According to various embodiments, the method may further include controlling the speed of the motor to a specified third speed, when the electronic device is performing the specified communication, is supplying power to the external device, or is connected to the OTG device in a state other than an OCP warning state, an SMPL warning state, a heat state, a state in which the battery level is equal to or lower than a specified level, and/or a state in which the internal consumption current is equal to or greater than a specified internal consumption current threshold.

According to various embodiments, the method may further include controlling the speed of the motor to a fourth speed higher than the specified third speed, when the electronic device is not performing the specified communication, is not supplying power to the external device, and is not connected to the OTG device in the state other than the OCP warning state, the SMPL warning state, the heat state, the state in which the battery level is equal to or lower than the specified level, and/or the state in which the internal consumption current is equal to or greater than the specified internal consumption current threshold.

Figure 8:
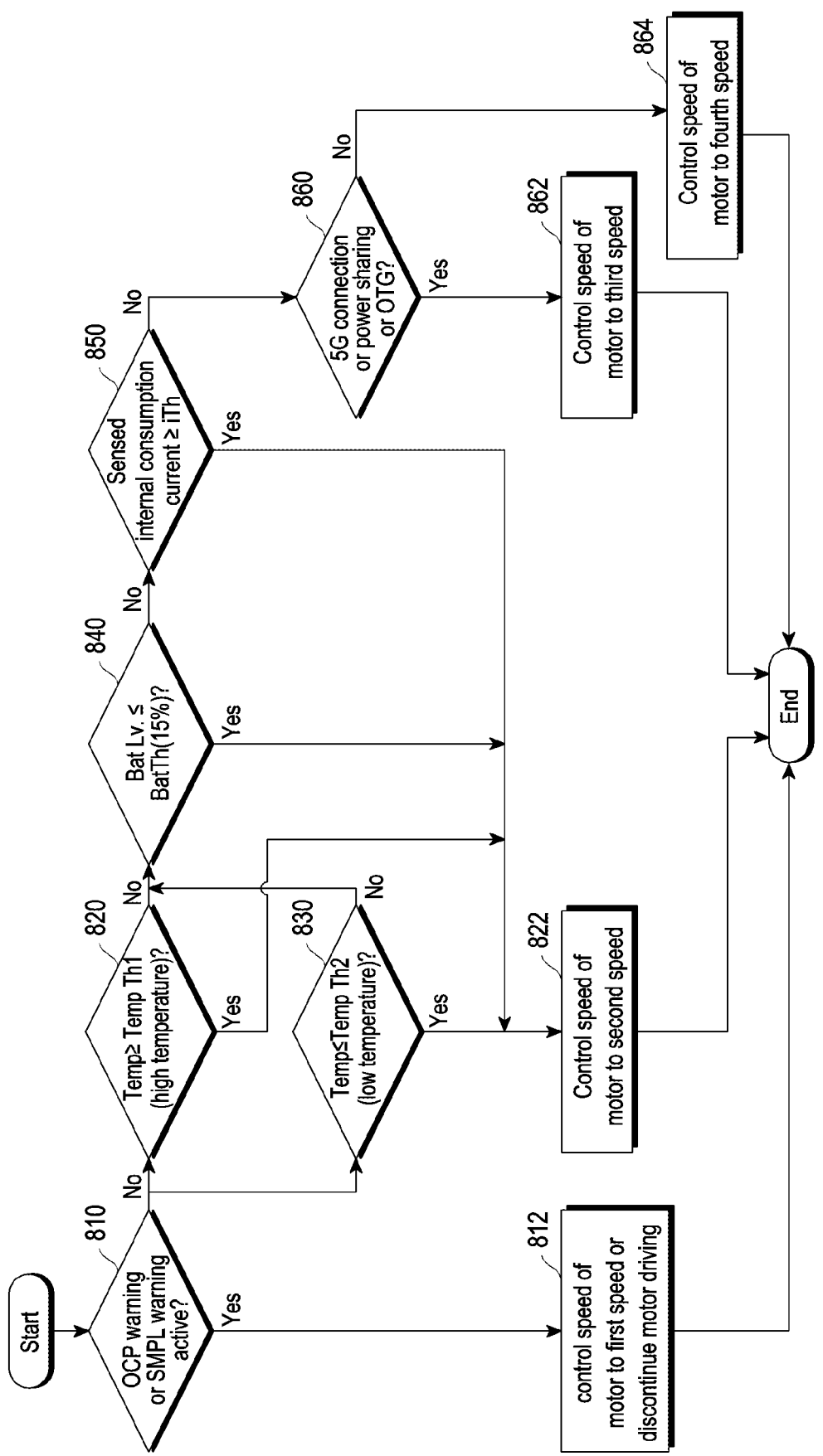
FIG. 8 is a flowchart illustrating a method of controlling motor driving based on identification of a plurality of states in an electronic device including a flexible display according to an embodiment.

FIG. 8 is a flowchart illustrating a method of controlling motor driving based on identification of a plurality of states in an electronic device including a flexible display according to an embodiment.

Referring to FIG. 8, a processor (e.g., the processor 120 of FIG. 1 or the processor 620 of FIG. 6) of an electronic device (e.g., the electronic device 101 of FIG. 1 or the electronic device 601 of FIG. 6) according to an embodiment may perform at least one of operations 810 to 864.

In operation 810, the processor 620 according to an embodiment may identify whether the state of the electronic device 601 is an OCP warning state or an SMPL warning state. For example, when a battery current is greater than a specified battery current threshold, the processor 620 according to an embodiment may identify the OCP warning state. For example, in the system power down state in which a battery voltage is lowered to or below (or below) a specified voltage (e.g., about 2V), the processor 620 according to an embodiment may identify the state of the electronic device 601 as the SMPL warning state.

If the state of the electronic device 601 is an OCP warning state or an SMPL warning state (operation 810: YES), in operation 812, the processor 620 according to an embodiment may control the speed of the motor to a first speed. For example, the first speed (e.g., a very low speed) may be lower than or equal to (or lower than) a specified speed.

If the state of the electronic device 601 is not an OCP warning state or an SMPL warning state (operation 810: NO), in operation 820, the processor 620 according to an embodiment may identify whether the internal temperature of the electronic device is equal to or greater than a specified first temperature (Temp≥Temp Th1). For example, when the internal temperature is equal to or higher than the specified first temperature, the state of the electronic device 601 may be a heat state.

In operation 822, when the state of the electronic device 601 is neither the OCP warning state nor the SMPL warning state, and the internal temperature of the electronic device is equal to or higher than the specified first temperature (Temp≥Temp Th1), the processor 620 according to an embodiment may control the speed of the motor 665 to a second speed. For example, the second speed may be higher than the first speed and lower than a third speed which is a general speed.

If the state of the electronic device 601 is not an OCP warning state or an SMPL warning state (operation 810: NO), in operation 830, the processor 620 according to an embodiment may identify whether the internal temperature of the electronic device is equal to or lower than a specified second temperature (Temp≤Temp Th2). For example, the specified second temperature may be lower than the first temperature, and may be a low temperature that affects the performance of the electronic device 601. When the state of the electronic device 801 is neither the OCP warning state nor the SMPL warning state, and the internal temperature of the electronic device is equal to or lower than the specified second temperature, the processor 620 according to an embodiment may proceed to operation 822 to control the speed of the motor 665 to the second speed.

If the internal temperature is neither higher than Temp Th1 nor lower than Temp Th2, (operation 820: NO and operation 830:NO), in operation 840, the processor 620 according to an embodiment may identify whether a remaining battery capacity is equal to or less than a specified capacity (e.g., 15%) (Bat lv.≤BatTh(15%)). When the state of the electronic device 801 is neither the OCP warning state nor the SMPL warning state, the internal temperature of the electronic device is lower than the specified first temperature and higher than the specified second temperature, and the remaining battery capacity is equal to or less than the specified capacity (e.g., 15%), the processor 620 according to an embodiment may proceed to operation 822 to control the speed of the motor 665 to the second speed in operation 822.

If the battery level is not equal to or less than BatTh (operation 840:NO), in operation 850, the processor 620 according to an embodiment may identify whether the internal consumption current is equal to or greater than a specified consumption current threshold iTh. In the state in which the state of the electronic device 601 is neither the OCP warning state nor the SMPL warning state, the internal temperature of the electronic device is lower than the specified first temperature and higher than the specified second temperature, and the remaining battery capacity is greater than the specified capacity (e.g., 15%), when the internal consumption current is equal to or greater than the specified consumption current threshold iTh, the processor 620 according to an embodiment may proceed to operation 822 to control the speed of the motor 665 to the second speed.

If the internal consumption current is not greater than or equal to iTh (operation 850:NO), in operation 860, the processor 620 according to an embodiment may identify whether the electronic device 601 is connected to 5G (or is communicating with 5G), is supplying charging power (sharing power), or is connected to an OTG device.

In operation 862, in the state in which the state of the electronic device 601 is neither the OCP warning state nor the SMPL warning state, the internal temperature of the electronic device is lower than the specified first temperature and higher than the specified second temperature, the remaining battery capacity is greater than the specified capacity (e.g., 15%), the internal consumption current is less than the specified consumption current threshold iTh, and the electronic device 601 is communicating with 5G, is supplying charging power, or is connected to an OTG device, the processor 620 according to an embodiment may control the speed of the motor 665 to the third speed. For example, the third speed may be a normal speed higher than the second speed.

In operation 864, in the state in which the state of the electronic device 601 is neither the OCP warning state nor the SMPL warning state, the internal temperature of the electronic device is lower than the specified first temperature and higher than the specified second temperature, the remaining battery capacity is greater than the specified capacity (e.g., 15%), and the internal consumption current is less than the specified consumption current threshold iTh, when the electronic device 601 is not communicating with 5G, is not supplying charging power, or is not connected to an OTG device, the processor 620 according to an embodiment may control the speed of the motor 665 to a fourth speed. For example, the fourth speed may be higher than the third speed.

Figure 9:
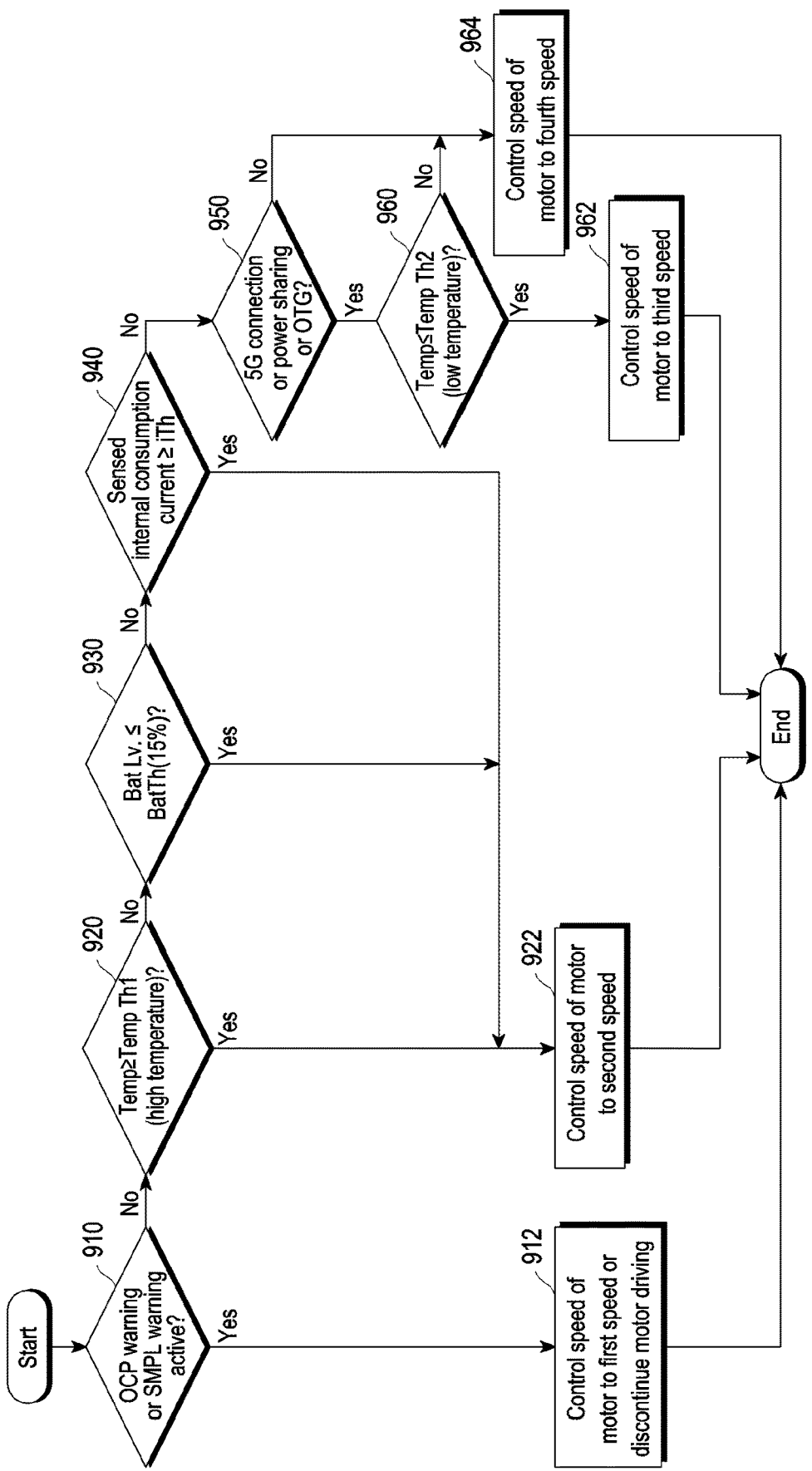
FIG. 9 is a flowchart illustrating an operation when it is identified whether the internal temperature of an electronic device including a flexible display is equal to or lower than a specified second temperature after identification of a $5^{th}$ generation (5G) connection state, a charging power supply state, or an OTG connection state, during control of motor driving in the electronic device including the flexible display according to an embodiment.

FIG. 9 is a flowchart illustrating an example operation, when it is identified whether the internal temperature of the electronic device is less than or equal to a specified second temperature after identification of a 5G connection state, a charging power supply state, or an OTG connection state, during control of motor driving in an electronic device including a flexible display according to various embodiments.

Referring to FIG. 9, a processor (e.g., the processor 120 of FIG. 1 or the processor 620 of FIG. 6) of an electronic device (e.g., the electronic device 101 of FIG. 1 or the electronic device 601 of FIG. 6) according to an embodiment may perform at least one of operations 910 to 964.

In operation 910, the processor 620 according to an embodiment may identify whether the state of the electronic device 601 is an OCP warning state or an SMPL warning state. For example when a battery current is greater than a specified battery current threshold, the processor 620 according to an embodiment may identify the state of the electronic device 601 as the OCP warning state. For example, in a system power down state in which a battery voltage is lowered to or below (or below) a specified voltage (e.g., about 2V), the processor 620 according to an embodiment may identify the state of the electronic device 601 as the SMPL warning state.

If the state of the electronic device 601 is an OCP warning state or an SMPL warning state (operation 910: YES), in operation 912, the processor 620 according to an embodiment may control the speed of the motor to a first speed. For example, the first speed may be a speed (e.g., a very low speed) equal to or lower than (or lower than) a specified speed.

If the state of the electronic device 601 is not an OCP warning state or an SMPL warning state (operation 910: NO), in operation 920, the processor 620 according to an embodiment may identify whether the internal temperature of the electronic device is equal to or greater than a specified first temperature (Temp≥Tempth1).

In operation 922, when the state of the electronic device 601 is neither the OCP warning state nor the SMPL warning state, and the internal temperature of the electronic device is equal to or higher than the specified first temperature (Temp≥Temp Th1), the processor 620 according to an embodiment may control the speed of the motor 665 to a second speed. For example, the second speed may be higher than the first speed and lower than a third speed which is a general speed.

If the internal temperature is not higher than Temp Th1 (operation 920: NO), in operation 930, the processor 620 according to an embodiment may identify whether a remaining battery capacity is equal to or less than a specified capacity (e.g., 15%) (Bat lv.≤BatTh(15%)). When the state of the electronic device 601 is neither the OCP warning state nor the SMPL warning state, the internal temperature of the electronic device is lower than the specified first temperature, and the remaining battery capacity is equal to or less than the specified capacity (e.g., 15%), the processor 620 according to an embodiment may proceed to operation 922 to control the speed of the motor 665 to the second speed.

If the battery level is not equal to or less than BatTh (operation 930:NO), in operation 940, the processor 620 according to an embodiment may identify whether an internal consumption current is equal to or greater than a specified consumption current threshold iTh. In the state in which the state of the electronic device 601 is neither the OCP warning state nor the SMPL warning state, the internal temperature of the electronic device is lower than the specified first temperature, and the remaining battery capacity is greater than the specified capacity (e.g., 15%), when the internal consumption current is equal to or greater than the specified consumption current threshold iTh, the processor 620 according to an embodiment may proceed to operation 922 to control the speed of the motor 665 to the second speed.

If the internal consumption current is not greater than or equal to iTh (operation 940:NO), in operation 950, the processor 620 according to an embodiment may identify whether the electronic device 601 is connected to 5G (or communicating with 5G), is supplying charging power (sharing power), or is connected to an OTG device.

In operation 960, in the state in which the state of the electronic device 601 is neither the OCP warning state nor the SMPL warning state, the internal temperature of the electronic device is lower than the specified first temperature, the remaining battery capacity is greater than the specified capacity (e.g., 15%), the internal consumption current is less than the specified consumption current threshold iTh, when the electronic device 601 is connected to 5G (or communicating with 5G), is supplying charging power, or is connected to an OTG device, the processor 620 according to an embodiment may identify whether the internal temperature of the electronic device is equal to or less than a specified second temperature (Temp≤Temp Th2).

In operation 962, in the state in which the state of the electronic device 601 is neither the OCP warning state nor the SMPL warning state, the internal temperature of the electronic device is lower than the specified first temperature and lower than the specified second temperature, the remaining battery capacity is greater than the specified capacity (e.g., 15%), the internal consumption current is less than the specified consumption current threshold iTh, and the electronic device 601 is communicating with 5G, is supplying charging power, or is connected to an OTG device, the processor 620 according to an embodiment may control the speed of the motor 665 to the third speed. For example, the third speed may be a general speed higher than the second speed.

In operation 964, in the state in which the state of the electronic device 601 is neither the OCP warning state nor the SMPL warning state, the internal temperature of the electronic device is lower than the specified first temperature and higher than the specified second temperature, the remaining battery capacity is greater than the specified capacity (e.g., 15%), the internal consumption current is less than the specified consumption current threshold iTh, and the electronic device 601 is not connected to 5G (or not communicating with 5G), is not supplying charging power, or is not connected to an OTG device, the processor 620 according to an embodiment may control the speed of the motor 665 to a fourth speed. For example, the fourth speed may be higher than the third speed.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term 'non-transitory' storage medium may refer, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-transitory storage medium may store instructions, and the instructions may be configured to, when executed by at least one processor, enable the at least one processor to perform at least one operation. The at least one operation may include identifying a slide operation start event of a flexible display, identifying at least one of a battery current, a battery voltage, an internal consumption current, a battery level, or an electronic device temperature based on information sensed through at least one sensor, based on the slide operation start event of the flexible display, and controlling a speed of a motor performing a slide operation of the flexible display or discontinuing driving of the motor, based on the at least one of the battery current, the battery voltage, the internal consumption current, the battery level, or the electronic device temperature.

The embodiments of the disclosure in the present specification and drawings are intended only to provide specific examples, for easy description of the technical ideas according to the embodiments of the disclosure and helping the understanding of the embodiments of the disclosure, not limiting the scope of the embodiments of the disclosure. Therefore, all changes or modifications derived from the technical ideas of various embodiments of the disclosure as well as the embodiments set forth herein should be interpreted as encompassed in the scope of various embodiments of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing configured to accommodate at least a part of the first housing and guide sliding movement of the first housing;
   a flexible display including a first display area coupled to the first housing and a second display area extending from the first display area;
   a gear disposed inside the second housing and configured to move the flexible display;
   a motor configured to rotate the gear;
   at least one sensor; and
   at least one processor,
   wherein the at least one processor is configured to:
     identify a state of the electronic device including at least one of a battery current, a battery voltage, an internal consumption current, a battery level, or an electronic device temperature, based on information sensed through the at least one sensor, and
     control a speed of the motor or discontinue driving of the motor based on the state of the electronic device.

2. The electronic device of claim 1, wherein the at least one processor is configured to further identify whether the electronic device performs specified communication, whether the electronic device supplies power to an external device, or whether the electronic device is connected to an on-the-go (OTG) device, and control the speed of the motor or discontinue the driving of the motor further based on whether the electronic device performs the specified communication, whether the electronic device supplies power to the external device, or whether the electronic device is connected to the OTG device.

3. The electronic device of claim 2, wherein the at least one processor is configured to control the speed of the motor to a specified third speed, when the electronic device is performing the specified communication, is supplying power to the external device, or is connected to the OTG device in a state other than an OCP warning state, an SMPL warning state, a heat state, a state in which the battery level is equal to or lower than a specified level, and a state in which the internal consumption current is equal to or greater than a specified internal consumption current threshold.

4. The electronic device of claim 3, wherein the at least one processor is configured to control the speed of the motor to a fourth speed higher than the specified third speed, when the electronic device is not performing the specified communication, is not supplying power to the external device, and is not connected to the OTG device in the state other than the OCP warning state, the SMPL warning state, the heat state, the state in which the battery level is equal to or lower than the specified level, and the state in which the internal consumption current is equal to or greater than the specified internal consumption current threshold.

5. The electronic device of claim 1, wherein the at least one processor is configured to:
   identify an overcurrent protection (OCP) warning state of the electronic device based on the battery current or identify a sudden momentary power loss (SMPL) warning state based on the battery voltage, and
   control the speed of the motor to a first speed lower than a specified speed or discontinue the driving of the motor, in the OCP warning state or the SMPL warning state.

6. The electronic device of claim 1, wherein the at least one processor is configured to:
   identify a heat state, when an internal temperature of the electronic device is equal to or higher than a specified first temperature based on the electronic device temperature, and
   control the speed of the motor to a second speed lower than a specified speed or discontinue the driving of the motor, in the heat state.

7. The electronic device of claim 1, wherein the at least one processor is configured to:
   identify a low temperature state, when an internal temperature of the electronic device is lower than a specified second temperature based on the electronic device temperature, and
   control the speed of the motor to a second speed lower than a specified speed in the low temperature state.

8. The electronic device of claim 1, wherein the at least one processor is configured to:
   identify a state in which the battery level is equal to or lower than a specified level based on the battery level, and
   control the speed of the motor to a second speed lower than a specified speed or discontinue the driving of the motor, in the state in which the battery level is equal to or lower than the specified level.

9. The electronic device of claim 1, wherein the at least one processor is configured to:
   identify a state in which the internal consumption current is equal to or greater than a specified internal consumption current threshold, based on the internal consumption current, and
   control the speed of the motor to a second speed lower than a specified speed or discontinue the driving of the motor, in a state in which the internal consumption current is equal to or greater than the specified internal consumption current threshold.

10. A method of controlling motor driving in an electronic device including a flexible display, the method comprising:
    identifying a slide operation start event of the flexible display;
    identifying at least one of a battery current, a battery voltage, an internal consumption current, a battery level, or an electronic device temperature based on information sensed through at least one sensor, based on the slide operation start event of the flexible display; and
    controlling a speed of a motor performing a slide operation of the flexible display or discontinuing driving of the motor, based on the at least one of the battery current, the battery voltage, the internal consumption current, the battery level, or the electronic device temperature.

11. The method of claim 10, further comprising:
identifying whether the electronic device performs specified communication, whether the electronic device supplies power to an external device, or whether the electronic device is connected to an on-the-go (OTG) device; and
controlling the speed of the motor or discontinuing the driving of the motor further based on whether the electronic device performs the specified communication, whether the electronic device supplies power to the external device, or whether the electronic device is connected to the OTG device.

12. The method of claim 11, further comprising:
controlling the speed of the motor to a specified third speed, when the electronic device is performing the specified communication, is supplying power to the external device, or is connected to the OTG device in a state other than an OCP warning state, an SMPL warning state, a heat state, a state in which the battery level is equal to or lower than a specified level, and/or a state in which the internal consumption current is equal to or greater than a specified internal consumption current threshold.

13. The method of claim 12, further comprising:
controlling the speed of the motor to a fourth speed higher than the specified third speed, when the electronic device is not performing the specified communication, is not supplying power to the external device, and is not connected to the OTG device in the state other than the OCP warning state, the SMPL warning state, the heat state, the state in which the battery level is equal to or lower than the specified level, and/or the state in which the internal consumption current is equal to or greater than the specified internal consumption current threshold.

14. The method of claim 10, further comprising:
identifying an overcurrent protection (OCP) warning state of the electronic device based on the battery current or identifying a sudden momentary power loss (SMPL) warning state based on the battery voltage, and
controlling the speed of the motor to a first speed lower than a specified speed or discontinuing the driving of the motor, in the OCP warning state or the SMPL warning state.

15. The method of claim 10, further comprising:
identifying a heat state, when an internal temperature of the electronic device is equal to or higher than a specified first temperature based on the electronic device temperature; and
controlling the speed of the motor to a second speed lower than a specified speed or discontinuing the driving of the motor, in the heat state.

16. The method of claim 10, further comprising:
identifying a low temperature state, when an internal temperature of the electronic device is lower than a specified second temperature based on the electronic device temperature; and
controlling the speed of the motor to a second speed lower than a specified speed in the low temperature state.

17. The method of claim 10, further comprising:
identifying a state in which the battery level is equal to or lower than a specified level based on the battery level; and
controlling the speed of the motor to a second speed lower than a specified speed or discontinuing the driving of the motor, in the state in which the battery level is equal to or lower than the specified level.

18. The method of claim 10, further comprising:
identifying a state in which the internal consumption current is equal to or greater than a specified internal consumption current threshold, based on the internal consumption current; and
controlling the speed of the motor to a second speed lower than a specified speed or discontinuing the driving of the motor, in a state in which the internal consumption current is equal to or greater than the specified internal consumption current threshold.

19. A non-transitory storage medium storing instructions, wherein the instructions are configured to, when executed by at least one processor of an electronic device, enable the electronic device to perform at least one operation, and
wherein the at least one operation includes:
identifying a slide operation start event of a flexible display;
identifying at least one of a battery current, a battery voltage, an internal consumption current, a battery level, or an electronic device temperature based on information sensed through at least one sensor, based on the slide operation start event of the flexible display; and
controlling a speed of a motor performing a slide operation of the flexible display or discontinuing driving of the motor, based on the at least one of the battery current, the battery voltage, the internal consumption current, the battery level, or the electronic device temperature.

20. The non-transitory storage medium of claim 19, wherein the at least one operation further comprises:
identifying whether an electronic device performs specified communication, whether the electronic device supplies power to an external device, or whether the electronic device is connected to an on-the-go (OTG) device; and
controlling the speed of the motor or discontinuing the driving of the motor further based on whether the electronic device performs the specified communication, whether the electronic device supplies power to the external device, or whether the electronic device is connected to the OTG device.

* * * * *